(12) United States Patent
Kajiyama et al.

(10) Patent No.: US 6,646,966 B2
(45) Date of Patent: Nov. 11, 2003

(54) AUTOMATIC STORAGE MEDIUM IDENTIFYING METHOD AND DEVICE, AUTOMATIC MUSIC CD IDENTIFYING METHOD AND DEVICE, STORAGE MEDIUM PLAYBACK METHOD AND DEVICE, AND STORAGE MEDIUM AS MUSIC CD

(75) Inventors: Ryo Kajiyama, Kawasaki (JP); Seiji Tsutsui, Kawasaki (JP); Hitoshi Sakazume, Inagi (JP); Yukikazu Emori, Nagano (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 09/953,949

(22) Filed: Sep. 18, 2001

(65) Prior Publication Data

US 2002/0031065 A1 Mar. 14, 2002

Related U.S. Application Data

(63) Continuation of application No. 08/611,090, filed on Mar. 5, 1996, now Pat. No. 6,288,991.

(30) Foreign Application Priority Data

| Mar. 6, 1995 | (JP) | 07-072358 |
| Mar. 6, 1995 | (JP) | 07-072374 |
| Mar. 15, 1995 | (JP) | 07-084655 |
| Mar. 15, 1995 | (JP) | 07-084920 |

(51) Int. Cl.[7] ............................................. G11B 7/00

(52) U.S. Cl. ............... 369/53.2; 369/53.22; 369/30.23; 369/30.3; 369/30.38

(58) Field of Search ..................... 369/275.3, 47.23, 369/53.1, 53.2, 30.23, 47.1, 30.3, 30.38, 30.4

(56) References Cited

U.S. PATENT DOCUMENTS

| 4,419,920 A | 12/1983 | Ohe ............................ 380/79 |
| 4,872,151 A | 10/1989 | Smith .......................... 369/32 |
| 4,922,476 A | 5/1990 | Kiyoura et al. ............... 369/32 |

(List continued on next page.)

FOREIGN PATENT DOCUMENTS

| JP | A-63-147196 | 6/1988 |
| JP | 63-147196 | 6/1988 |
| JP | A-158687 | 6/1989 |

(List continued on next page.)

OTHER PUBLICATIONS

Information technology—Data interchange on read–only 120 mm optical data disks (CD–ROM), Reference No. ISO/IEC 10149 : 1989 (E), pp. 43.

Information processing—Volume and file structure of CD–ROM for information interchange, Reference No. ISO 9660 : 1988 (E), pp. 31.

Norme Internationale International Standard, Reference No. CEI IEC 908 1987.

Norme Internationale International Standard, Reference No. CEI IEC 908 1987, Amendment 1 Compact disc digital audio system, Sep. 1992.

Corrigendum, Amendment 1 to Publication 908, Compact disc digital audio system.

*Primary Examiner*—Nabil Hindi
(74) *Attorney, Agent, or Firm*—Staas & Halsey LLP

(57) ABSTRACT

A data reproducing unit reproduces data read by a first reading unit from a storage medium. A storage unit stores added information corresponding to data stored on the storage medium. The added information is read by the second reading unit and reproduced by an added information reproducing unit. A control unit controls such that the data is reproduced by the data reproducing unit in synchronism with the reproduction of the added information by the added information reproducing unit.

4 Claims, 23 Drawing Sheets

U.S. PATENT DOCUMENTS

| | | | |
|---|---|---|---|
| 5,315,570 A | 5/1991 | Miura et al. | 369/59 |
| 5,159,670 A | 10/1992 | Suzuki et al. | 369/34 |
| 5,243,582 A | 9/1993 | Yamauchi et al. | |
| 5,247,126 A | 9/1993 | Okamura et al. | |
| 5,250,787 A | 10/1993 | Arii et al. | 369/32 |
| 5,263,010 A | 11/1993 | Amemiya et al. | 369/47 |
| 5,268,889 A | 12/1993 | Furukawa et al. | 369/32 |
| 5,299,181 A | 3/1994 | Koguchi | 369/32 |
| 5,341,253 A | 8/1994 | Liao et al. | |
| 5,392,264 A | 2/1995 | Hira | 369/30 |
| 5,397,853 A | 3/1995 | Koguchi | |
| 5,414,686 A | 5/1995 | Iitsuka | |
| 5,446,714 A | 8/1995 | Yoshio et al. | |
| 5,450,312 A | 9/1995 | Lee et al. | 369/32 |
| 5,465,240 A | 11/1995 | Mankovitz | |
| 5,469,370 A | 11/1995 | Ostrover et al. | 389/60 |
| 5,481,509 A | 1/1996 | Knowles | 369/30 |
| 5,484,032 A | 1/1996 | Li | 369/56 |
| 5,499,922 A | 3/1996 | Umeda et al. | |
| 5,544,145 A | 8/1996 | Muraoka et al. | 369/32 |
| 5,550,735 A | 8/1996 | Slade et al. | 369/84 |
| 5,557,590 A | 9/1996 | Matsumoto et al. | 369/32 |
| 5,561,815 A | 10/1996 | Takuta et al. | 369/32 |
| 5,587,979 A | 12/1996 | Bluthgen | 369/32 |
| 5,587,981 A * | 12/1996 | Kamatani | 369/32 |
| 5,611,693 A | 3/1997 | Chaya et al. | 369/34 |
| 5,617,383 A | 4/1997 | Matsumoto et al. | 369/32 |
| 5,625,610 A | 4/1997 | Hiyanuma | 369/84 |
| 5,654,516 A | 8/1997 | Tashiro et al. | 84/601 |
| 5,668,339 A | 9/1997 | Shin | 84/634 |
| 5,683,253 A | 11/1997 | Park et al. | 369/32 |
| 5,715,220 A | 2/1998 | Nagashima | 369/32 |
| 5,750,911 A | 5/1998 | Tamura | 84/602 |
| 5,768,396 A | 6/1998 | Sone | 84/601 |
| 5,774,314 A | 6/1998 | Eggen et al. | 369/32 |
| 5,801,676 A | 9/1998 | Maruyama et al. | 345/123 |
| 5,803,747 A | 9/1998 | Sone et al. | 434/307 |
| 5,808,987 A | 9/1998 | Oda et al. | 369/32 |
| 5,854,619 A | 12/1998 | Kato | 345/116 |
| 5,859,380 A | 1/1999 | Anada | 84/611 |
| 5,861,567 A | 1/1999 | Hirano | 84/609 |

FOREIGN PATENT DOCUMENTS

| | | |
|---|---|---|
| JP | A-5-28719 | 2/1993 |
| JP | 5-28719 | 2/1993 |
| JP | A-5-128814 | 5/1993 |
| JP | 5-128814 | 5/1993 |
| JP | A-5-144238 | 6/1993 |
| JP | A-5-166344 | 7/1993 |
| JP | 5-166344 | 7/1993 |
| JP | A-6-111469 | 4/1994 |
| JP | A-7-14299 | 1/1995 |

\* cited by examiner

FIG. 9A

330 CD INFORMATION

| CD TITLE OF FOREIGN MUSIC |
|---|
| CD PRONUNCIATION OF FOREIGN MUSIC TITLE |
| CD TITLE OF JAPANESE MUSIC |
| CD PRONUNCIATION OF FOREIGN MUSIC TITLE |
| CD PHOTO (FILE NAME) | ⇒ JACKET PHOTO FILE (IMAGE)
| CD ALBUM INFORMATION (FILE NAME) | ⇒ ALBUM INFORMATION FILE (TEXT)
| CD TOTAL PERFORMANCE TIME |
| CD ARTIST NAME |
| CD PRODUCER NAME |
| CD ORIGAINAL PUBLISHER NAME |
| CD SUBPUBLISHER NAME |
| CD COPYRIGHT |
| CD NUMBER OF MUSIC PIECES |

335 — CD PHOTO (FILE NAME)
336 — CD ALBUM INFORMATION (FILE NAME)
337 — CD TOTAL PERFORMANCE TIME
338 — CD NUMBER OF MUSIC PIECES

FIG. 9B

340 ARTIST INFORMATION

| NAME |
|---|
| PRONUNCIATION OF NAME |
| ARTIST INFORMATION (FILE NAME) | ⇒ ARTIST INFORMATION (TEXT)
| PHOTO (FILE NAME) | ⇒ ARTIST PHOTO FILE (IMAGE)
| GENDER |

343 — ARTIST INFORMATION (FILE NAME)
344 — PHOTO (FILE NAME)

FIG. 9C

350 MUSIC INFORMATION

| CD NAME |
|---|
| ARTIST NAME |
| SONG WRITER |
| COMPOSER |
| RECOMPOSER |
| MUSIC NUMBER IN CD |
| PERFORMANCE TIME |
| WORDS (FILE NAME) | ⇒ WORD FILE (TEXT)
| COPYRIGHT |
| TITLE OF JAPANESE MUSIC |
| PRONUNCIATION OF JAPANESE MUSIC TITLE |
| TITLE OF FOREIGN MUSIC |
| PRONUNCIATION OF FOREIGN MUSIC TITLE |

357 — PERFORMANCE TIME
358 — WORDS (FILE NAME)

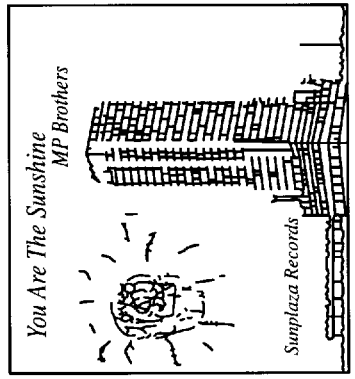
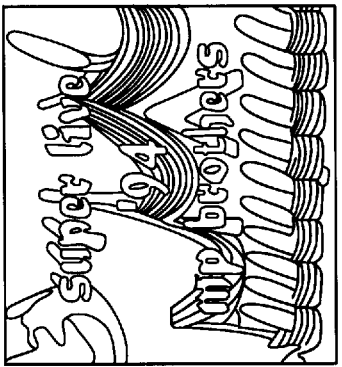
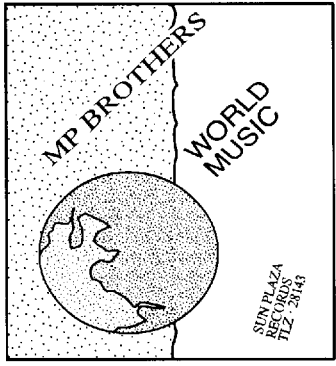

405 →

406 →

| | | |
|---|---|---|
| LAY DOWN MY LOVE | HOLD OUT | STANDING IN THE MORNING |
| NOW IT | WISHFUL THINKING MORE | COLOR LIFE |
| TEARS FALLING ON FACE | TAKE IT EASY | TO FIVES |
| TOO HIGH MOUNTAIN | AUTUMN PICTURE | LAST NIGHT |
| EVERY ONE | VERY SUPERSTISION | SPRING RAIN |
| NIGHT TRAIN | IT'S NEVER TOO FAST | MONDAY'S NIGHTMARE |
| CALL ME AGAIN | HAVE YOU NEVER BEEN | HEARTFULL |
| LOVING YOU SO MUCH | WOMAN AND MAN | LADYS |
| BOOGIE ON BOOGIE | DOWN TOWN BOY | ONE TWO JUMP |
| YOU ARE THE SUNSHINE | GOODBYE AGAIN | |

FIG. 16

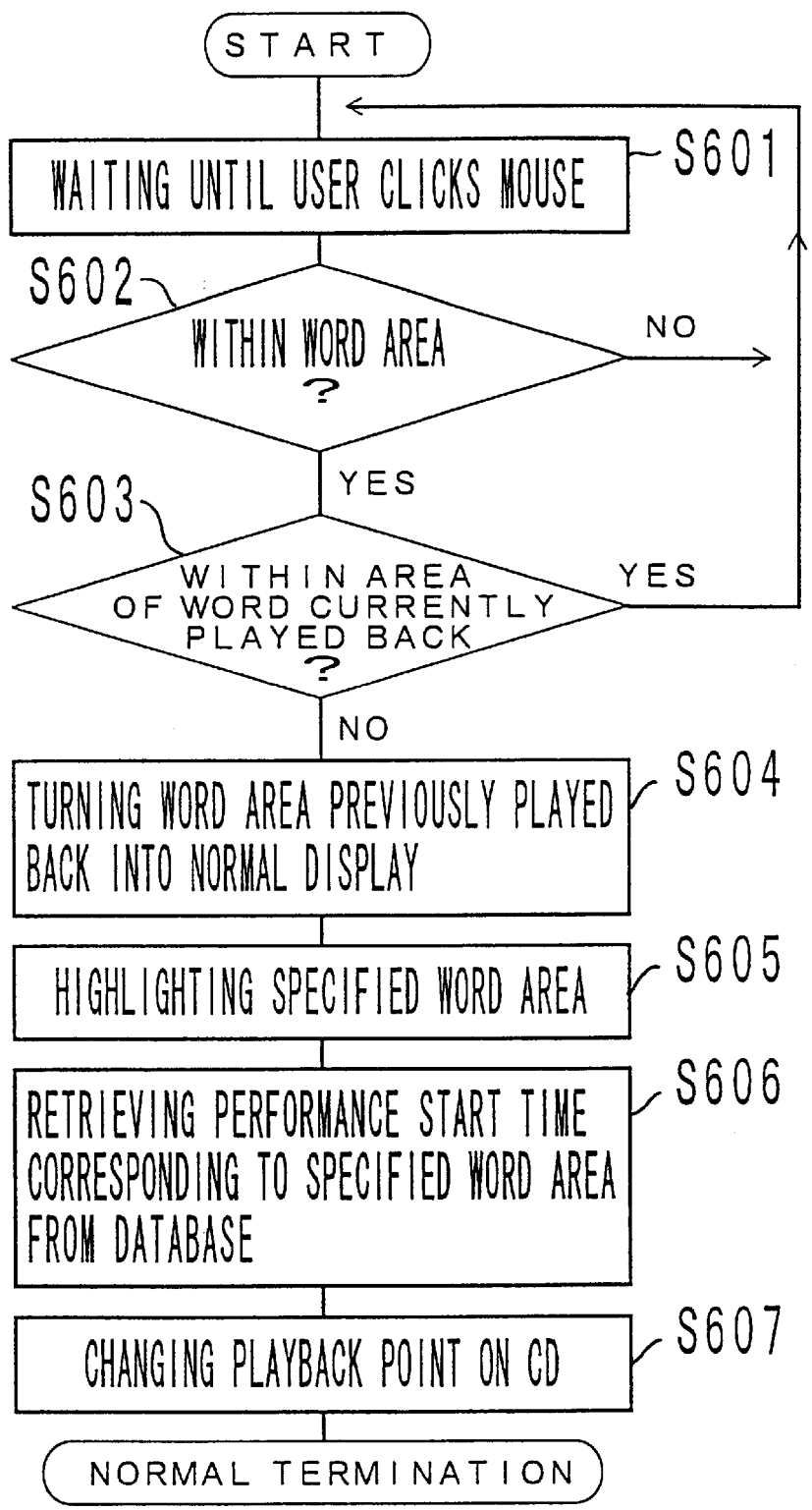
F I G. 22

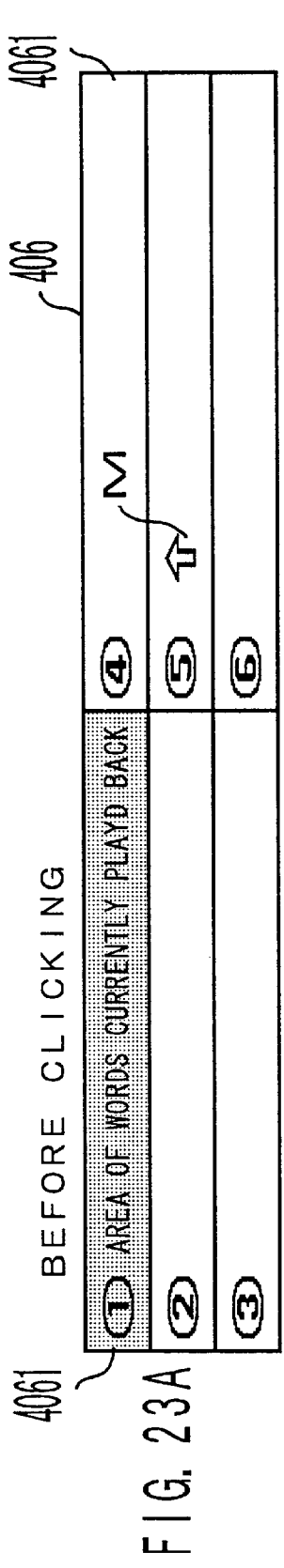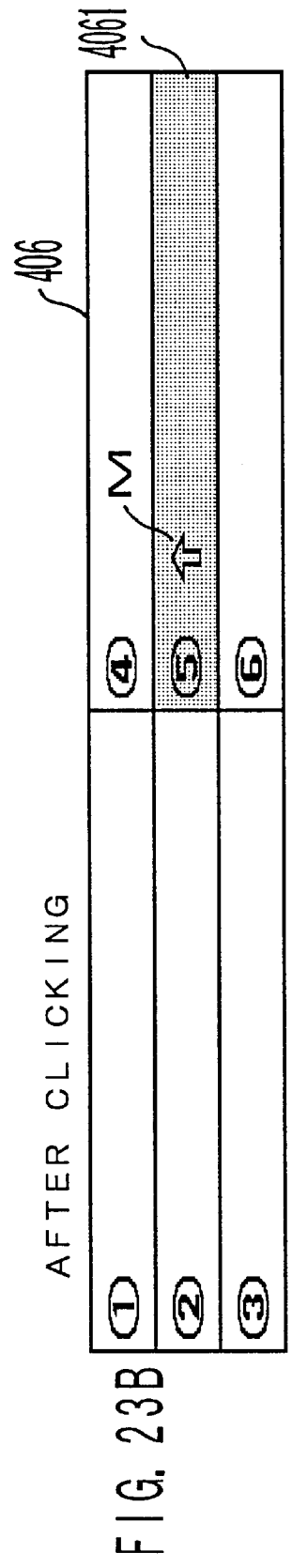
FIG. 23

AUTOMATIC STORAGE MEDIUM IDENTIFYING METHOD AND DEVICE, AUTOMATIC MUSIC CD IDENTIFYING METHOD AND DEVICE, STORAGE MEDIUM PLAYBACK METHOD AND DEVICE, AND STORAGE MEDIUM AS MUSIC CD

CROSS REFERENCE TO RELATED APPLICATIONS

This application is a continuation application of U.S. application Ser. No. 08/611,090, filed Mar. 5, 1996, now U.S. Pat. No. 6,288,991.

This application is based upon and claims priority of U.S. application Ser. No. 08/611,090, filed Mar. 5, 1996, Japanese patent application nos. 7-072374 and 7-072358, both filed Mar. 6, 1995, and Japanese patent application nos. 7-084655 and 7-084920, both filed Mar. 15, 1995, the contents being incorporated herein by reference.

BACKGROUND OF THE INVENTION

1. Field of the Invention

The present invention relates to storage media which store data in a predetermined format, to identifying data in the storage media which store the data in the predetermined format, and to reading data stored in the storage media.

2. Description of the Prior Art

With a major technological advantage over other storage media in dynamic range, SN ratio, capacity, and portability, compact disks (CD) have been widely used as storage media for storing music data (audio data). Music software is, in most cases, stored on music CD (CD-DA) for sale.

The data format stored in the music CD is regulated by one of the international standards. Although there are a few international standards, they are based on the same data format. That is, the contents of the stored audio data, normally referred to as the TOC (table of contents), are written to the read-in area (the innermost track). The program area is provided outside the TOC to store audio data, etc. The program area is physically divided by tracks, and the TOC data refer to the total performance time, total number of the music pieces, the performance time of each music piece, etc. Audio data of two channels (L and R) is written to each track in frame units. Data of 1 frame consists of a frame synchronization signal, a sub-code, audio data, a parity bit, etc.

The sub-code area consists of 8 bits, that is, P, Q, R, S, T, U, V, and W. The P and Q bits of the area store the control data for the program functions such as detecting the start of each music piece, indicating the performance time, playing music in a predetermined order. Although the audio data cannot be directly read from the music CD, the TOC data and the sub-code area data can be successfully read.

Normally, the music CDs only store the control data for use in reading audio data to play only music. Therefore, the music CDs are commonly used to only play the stored music and do not serve sufficiently when the user wants to learn the stored music because the user has to be provided with a memo of the words. The user also has to obtain from magazines or other information sources the information about the music stored on the music CD.

It seems to be indispensable for the music CDs to be designed to remove this inconvenience, further to allow the user to listen to the specified portion of the performance of the music, or to repeatedly listen to the specified portion of the performance.

The problems with the music CDs are also those with other CDs such as CD-Gs and the storage media providing various formats of data.

On the other hand, CDs are used as read-only memory (CD-ROM). Since the CD-ROM also has the above described advantage, it is widely utilized as the storage media for storing programs and data. Therefore, a CD-ROM drive (CD playback device) is incorporated into a desk-top personal computer as a standard component these days. With an increasing popularity of multimedia, a number of computers are originally equipped with sound sources.

The computers equipped with sound sources and CD playback devices are normally designed to play back music DCs. The music CDs are very popular music media used by people of all ages and cover various categories and a large number of music pieces in each category. Therefore, adding a function of multimedia as an element of amusement to the popularly used music CDs will ensure the strong upturn of the popularity and sales of the music CDs, thereby greatly contributing to enlarging the music market. The users have expected the functions to be easily added to the existing functions.

The above explanation has concentrated on the CDs because they are very popular storage media at present. If storage media other than the CDs, such as mini-disks (MDs), become popular in the market, then the similar request will be issued to the MDs.

SUMMARY OF THE INVENTION

The first object of the present invention is to provide storage media which store audio data as user-oriented high-amusement media.

The second object of the present invention is to provide a method and a device for playing back a storage medium extended in its usage format by providing added information about the contents of the storage medium when playing back the storage medium containing data in a certain format.

The storage media according to the present invention store added information corresponding to music CDs as database. The storage media include CD-ROM, MDs, magnetic disks, and optical magnetic disks. Reading the added information in the storage media allows the user to be provided with various information about the music CDs.

The usage of the storage media is to store data stored on one of the first and second storage media on the third storage medium, to read the data stored on the other storage medium, and to read the data stored on the third storage medium. For example, if the first and second storage media are the same type, then the data on one storage medium is stored on the third storage medium of a different type, the data stored on the other storage medium is read, and the data stored on the third storage medium is read.

Thus, the data stored on the storage media can be used in an extended usage format to provide the user with another element of amusement. As a result, the storage media can be provided for the user as attractive amusement.

According to the automatic storage medium identifying method of the present invention, predetermined information is read from the storage medium, the read information is compared with predetermined storage medium data identification information, and the storage medium data is identified according to the comparison result.

The automatic storage medium identifying device according to the present invention consists of a reading unit for reading predetermined information from a storage medium;

a comparing unit for comparing the predetermined information read by the reading unit with the storage medium identification information stored on the predetermined storage unit; and an identifying unit for identifying the difference in contents of the stored data according to the comparison result.

The automatic storage medium identifying device according to the present invention consists of a first reading unit for reading predetermined information stored in a predetermined data format on the storage medium; a second reading unit for reading identification information from a storage unit storing storage medium identification information; and an identifying unit for comparing the predetermined information read from the storage medium by the first reading unit with the storage medium identification information read by the second reading unit to identify a storage medium storing different data.

In the above described automatic storage medium identifying device, the predetermined data format stored on a storage medium should be sound data. When the storage medium is a music CD, the first reading unit reads the table-of-contents (TOC) data in the read-in area of the music CD. The identifying unit obtains from the TOC data read by the first reading unit at least the total performance time, total number of music pieces, and performance time of each music piece. Then, it sequentially compares the data with the identification information read from the storage medium by the second reading unit, and identifies the storage medium.

According to the automatic music CD identifying method of the present invention, the TOC data is read from the read-in area of the music CD storing sound data, the information contained in the read TOC data is sequentially compared with the identification information in each music CD, and the music CD, from which the TOC data is read, is identified according to the comparison result.

The information obtained from the TOC data used in the comparison should is at least one of the total performance time, total number of music pieces, and performance time of each music piece.

According to the playback method of the present invention, the information from the read data is displayed in synchronism with the reproduction of the data stored on the storage medium.

In this playback method, the storage medium is a music CD, and the words should be displayed on the screen during the playback of the music CD. It is also preferable that the words and the translation (if the words are written in a foreign language) are displayed on the screen during the reproduction of the sound data.

The storage medium playback device according to the present invention consists of a reading unit for reading sound data from the first storage medium; a control unit for reading added information for the sound data from a second storage medium and writing the added information to a third storage medium; a sound reproducing unit for reproducing the sound data read by the first reading unit; and an added information display unit for displaying the added information read from the third storage medium.

With the above described configuration, for example, it is preferable that the first storage medium is a music CD, the second storage medium is a CD-ROM, and the third storage medium is an auxiliary storage device. The control unit should be designed to write, when the reading unit reads the added information from the second storage medium, the read added information to the third storage medium and store on the third storage medium the database with the written added information stored as one unit.

The storage medium playback device consists of a first reading unit for reading data stored on a storage medium; a second reading unit for reading added information from a storage unit storing added information for the data stored on the storage medium; a reproducing unit for reproducing the data read by the first reading unit; a display unit for displaying the added information of the data read by the second reading unit; and a control unit for synchronize the reproduction of the data from the reproducing unit with the display of the added information for the reproduced data.

In the above described storage medium playback device, the storage medium should be a music CD. Using a music CD as a storage medium, the control unit should control the display unit such that the words can be displayed in synchronism with the data being reproduced by the reproducing unit. The control unit should control the display unit such that the unit can display the words of the music together with the translation, if the words are written in a foreign language, when the sound data are reproduced by the reproducing unit. Furthermore, the storage medium should store as a database the added information corresponding to the stored data for each of a plurality of storage media containing different stored data.

The storage medium playback device according to the present invention consists of a first reading unit for reading data stored on a storage medium; a second reading unit for reading added information from a storage unit storing added information for the data stored on the storage medium; a reproducing unit for reproducing the data read by the first reading unit; a display unit for displaying the added information of the data read by the second reading unit; a control unit for synchronize the reproduction of the data from the reproducing unit with the display of the added information for the reproduced data; a specifying unit for specifying any added information displayed on the display unit; and a second control unit for reading, through the first reading unit, the data corresponding to the added information specified by the specifying unit from the storage medium, and for reproducing the data through the reproducing unit.

The storage medium playback device according to the present invention consists of a first reading unit for reading data stored on a storage medium; a second reading unit for reading added information from a storage unit storing added information for the data stored on the storage medium; a reproducing unit for reproducing the data read by the first reading unit; a display unit for displaying the added information of the data read by the second reading unit; a specifying unit for specifying any added information displayed on the display unit; a third reading unit for reading the data corresponding to the added information specified by the specifying unit from the storage medium; and a second reproducing unit for reproducing the data read by the third reading unit.

The storage medium playback device according to the present invention consists of a first reading unit for reading data stored on a storage medium; a second reading unit for reading added information from a storage unit storing added information for the data stored on the storage medium; a reproducing unit for reproducing the data read by the first reading unit; a display unit for displaying the added information of the data read by the second reading unit; a control unit for synchronize the reproduction of the data from the reproducing unit with the display of the added information for the reproduced data; a specifying unit for specifying any added information displayed on the display unit; a third reading unit for reading the data corresponding to the added information specified by the specifying unit from the storage medium; and a second reproducing unit for reproducing the data read by the third reading unit.

The automatic storage medium identifying device according to the present invention consists of a first reading unit for reading predetermined information from a storage medium; a comparing unit for sequentially comparing the predetermined information read by the first reading unit with the storage medium identification information prepared for each type of data contents and stored on a first storage unit; an identifying unit for identifying the difference in contents of the stored data according to the comparison result; a second reading unit for reading from the storage medium the data stored on the storage medium and identified by the identifying unit; a third reading unit for reading added information from a second storage unit storing the added information for the data stored on the storage medium; a data reproducing unit for reproducing the data read by the second reading unit; a display unit for displaying the added information for the data read by the third reading unit; and a control unit for synchronize the reproduction of the data from the reproducing unit with the display of the added information for the reproduced data.

BRIEF DESCRIPTION OF THE DRAWINGS

FIG. 9 shows the state of the display screen in the mode transition or in each mode according to the embodiment of the present invention;

FIG. 16 is a flowchart showing the activation process according to the embodiment of the present invention;

FIG. 22 shows the change of the performance.

DETAILED DESCRIPTION OF THE PREFERRED EMBODIMENTS

Figure 1:
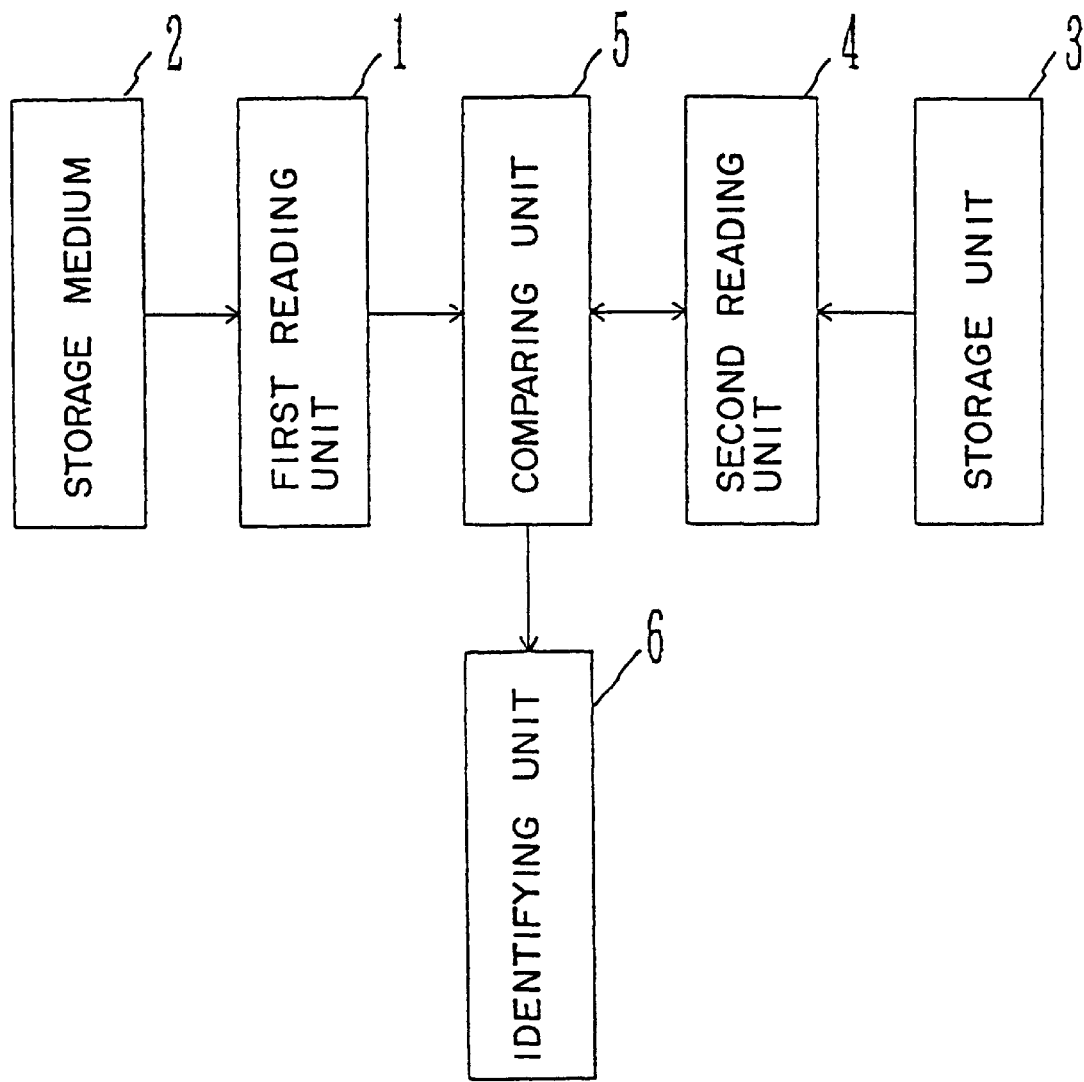
FIG. 1 is a block diagram showing the automatic storage medium identifying device according to the present invention.

The automatic storage medium identifying device according to the present invention is described below by referring to FIG. 1.

A first reading unit 1 reads predetermined information from a storage medium 2.

A storing unit 3 stores identification information for use in identifying the storage medium 2 by referring to the predetermined information stored on the storage medium 2. A second reading unit 4 reads the identification information about the storage medium 2 from the storing unit 3.

A comparing unit 5 compares the predetermined information about the storage medium 2 read by the first reading unit 1 with the identification information about the storing unit 3 read by the second reading unit 4.

An identifying unit 6 receives from the comparing unit 5 the comparison result between the predetermined information about the storage medium 2 and the identification information about the storing unit 3 and identifies the storage medium 2 according to the comparison result.

That is, the automatic storage medium identifying device (automatic identifying device) according to the present invention recognizes and reads the unique information stored on the storage medium 2, and sequentially compares it with the identification information about the storage medium 2 prepared in the storing unit 3 to identify the storage medium 2.

For example, is the storage medium 2 is a music DC, the TOC data is read, and the music CD is identified by its total performance time, total number of music pieces, and performance time of each music piece. Actually, there are no music CDs exactly matching each other in total performance time, total number of music pieces, and performance time of each music piece. Therefore, the storing unit 3 stores the information to exactly identify the storage medium 2.

Figure 2:
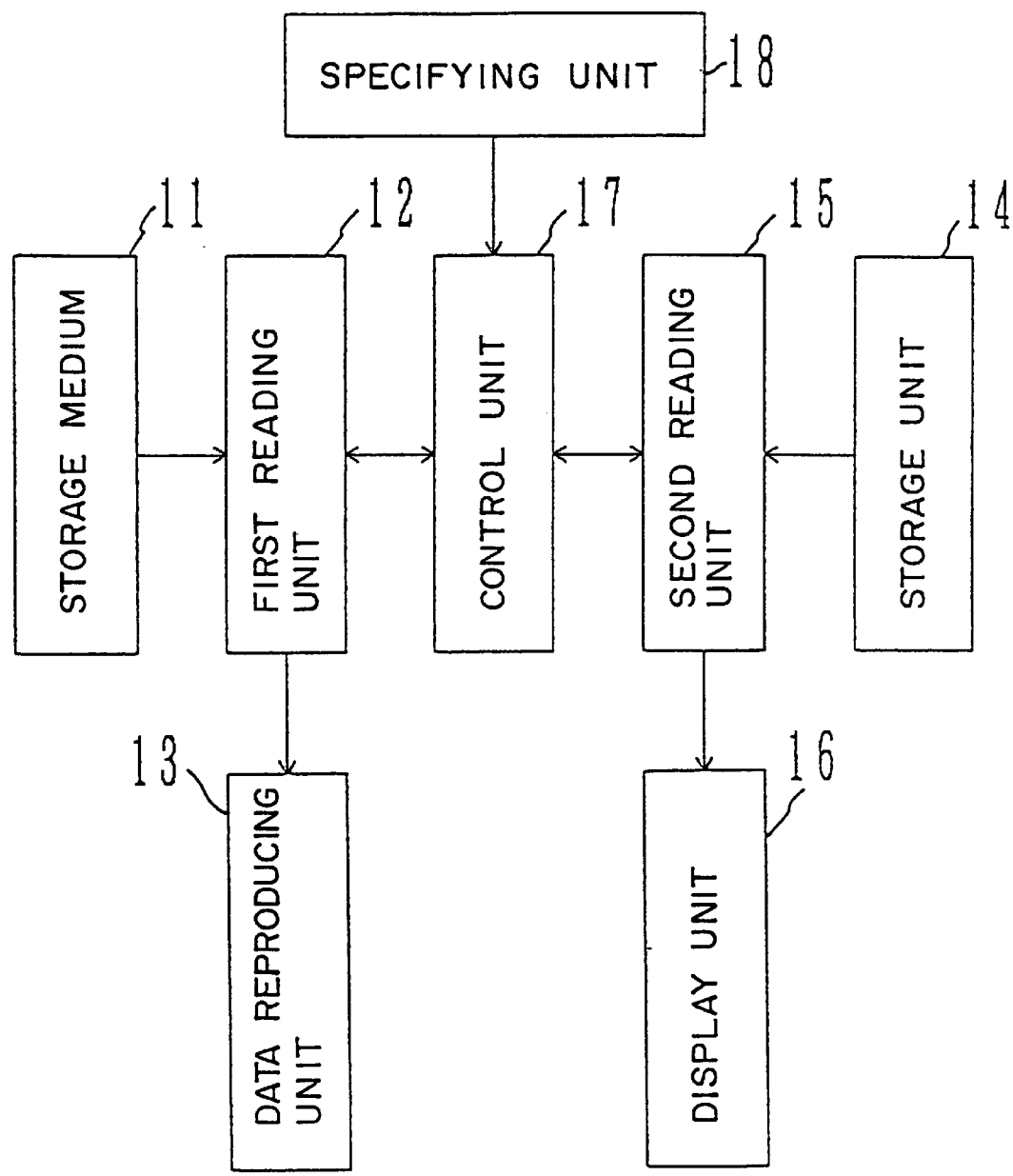
FIG. 2 is a block diagram showing the storage medium playback device according to the present invention.

The storage medium playback device according to the present invention is described below by referring to FIG. 2.

A storage medium 11 stores, for example, sound data. A first reading unit 12 reads data stored on the storage medium 11. A data reproducing unit 13 reproduces the data read by the first reading unit 12.

A storing unit 14 stores the added information for the data stored on the storage medium 11. A second reading unit 15 reads the added information from the storing unit 14. A display unit 16 displays the added information read by the second reading unit 15.

A control unit 17 controls, for example, the first reading unit 12 and second reading unit 15 to synchronize the reproduction of the data read by the data reproducing unit 13 from the storage medium 11 the reproducing unit with the display of the added information read by the display unit 16 from the storing unit 14.

A specifying unit 18 specifies any point at which the data stored on the storage medium 11 is to be reproduced. When music sound of data is stored on the storage medium 11, the reproduction point is specified according to various points such as a specific phrase of the music, time from the head of the music, etc. The control unit 17 controls to reproduce the data stored on the storage medium 11 from the reproduction point specified by the specifying unit 18 and display the added information stored in the storing unit 14. Furthermore, the specifying unit 18 specifies the contents (for example, the words, music information, artist information, discography information, etc.) to be displayed in synchronism with the reproduction of the music CD according to the added information.

When the storing unit 14 stores the identification information about the storage medium 11, the control unit 17 allows the first reading unit 12 to read predetermined information from the storage medium 11, compares the predetermined information with the identification information read by the second reading unit 15 from the storing unit 14, and identify the storage medium 11. According to the obtained identification result, the second reading unit 15 reads the added information for the storage medium 11 from the added information stored in the storing unit 14.

Thus, the storage medium playback method (operated with the reproducing device) synchronizes the reproduction of the data stored on the storage medium 11 with the display of the added information stored in the storing unit 14.

For example, when the storage medium 11 stores performance data and the storing unit 14 stores the word data corresponding to the performance data, the word data is read and displayed in synchronism with the reproduction of the performance data of the music. Thus, reproducing the added information using another medium in synchronism with the reproduction of the data stored on the storage medium 11 increases selection items of amusement and improves the amusing elements of the storage medium 11.

Figure 3:
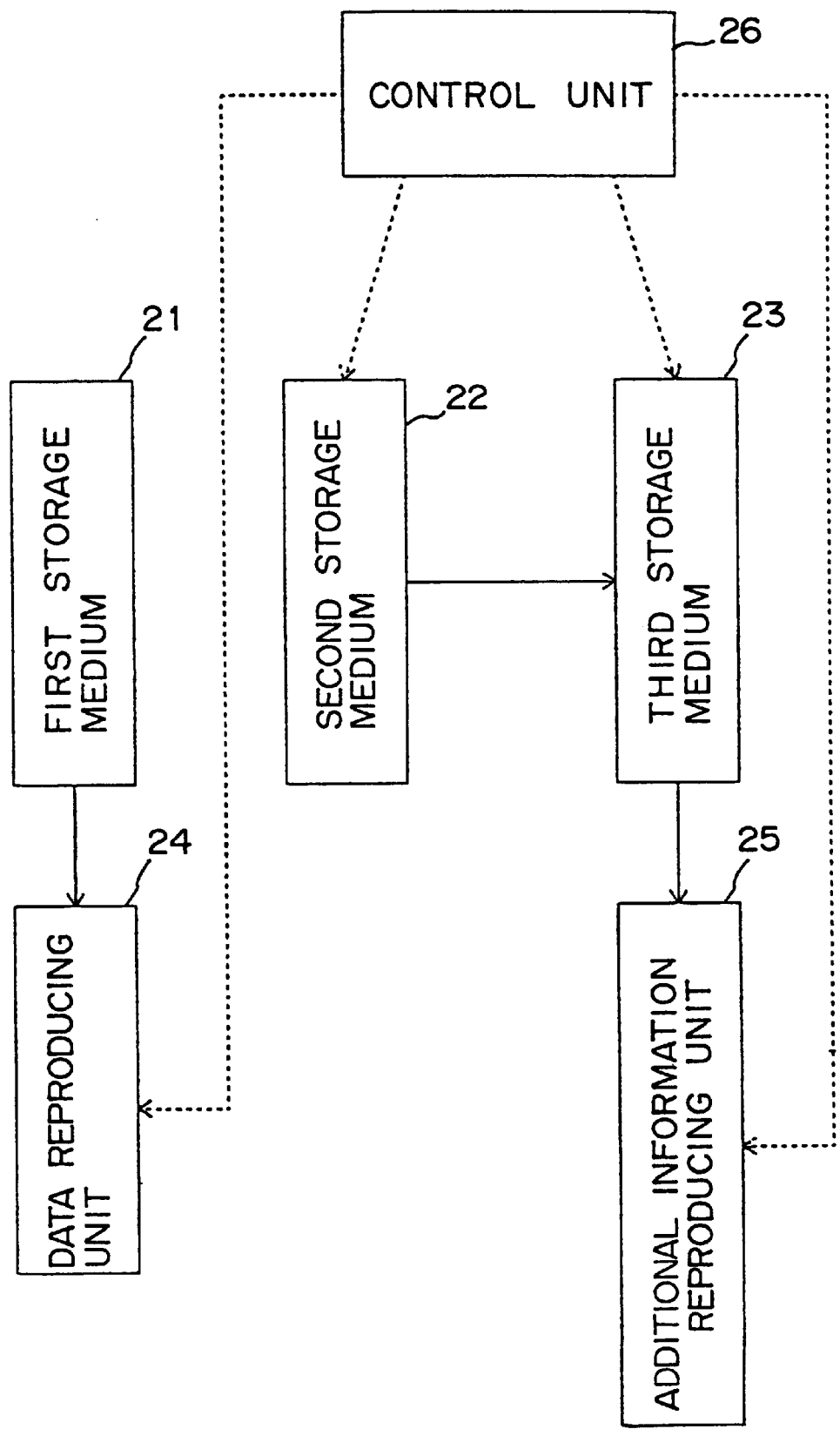
FIG. 3 shows the configuration and the flow of the operations of the entire system according to the present invention.

FIG. 3 shows the configuration of the entire system and the flow of the operations according to the present invention.

An example of the system according to the present invention can be a personal computer consisting of a music CD 101 storing sound information (audio data); a CD-ROM 102 for storing the added information corresponding to the music CD 101 and viewer software; an auxiliary storage device 105 for storing the added information and viewer software from the CD-ROM 102 in a CD data file 104 and a viewer software 103; and a memory (main storage device) 106 for copying a part of the added information and viewer software 103 from the auxiliary storage device 105.

The added information for the music CD 101 is provided by the CD-ROM 102 because it stores a large amount of data. The CD-ROM 102 storing the above described added information also stores the viewer software 103 for displaying the added information for the music CD 101 in synchronism with the reproduction of the sound information stored in the music CD 101. The CD-ROM 102 also stores an installation program for installing the viewer software 103. A file used in reproducing the music CD 101 is packed and provided by the CD-ROM 102.

The sound reproduction/display system according to the embodiment of the present invention is realized by the viewer software 103 and various hardware.

Figure 5:
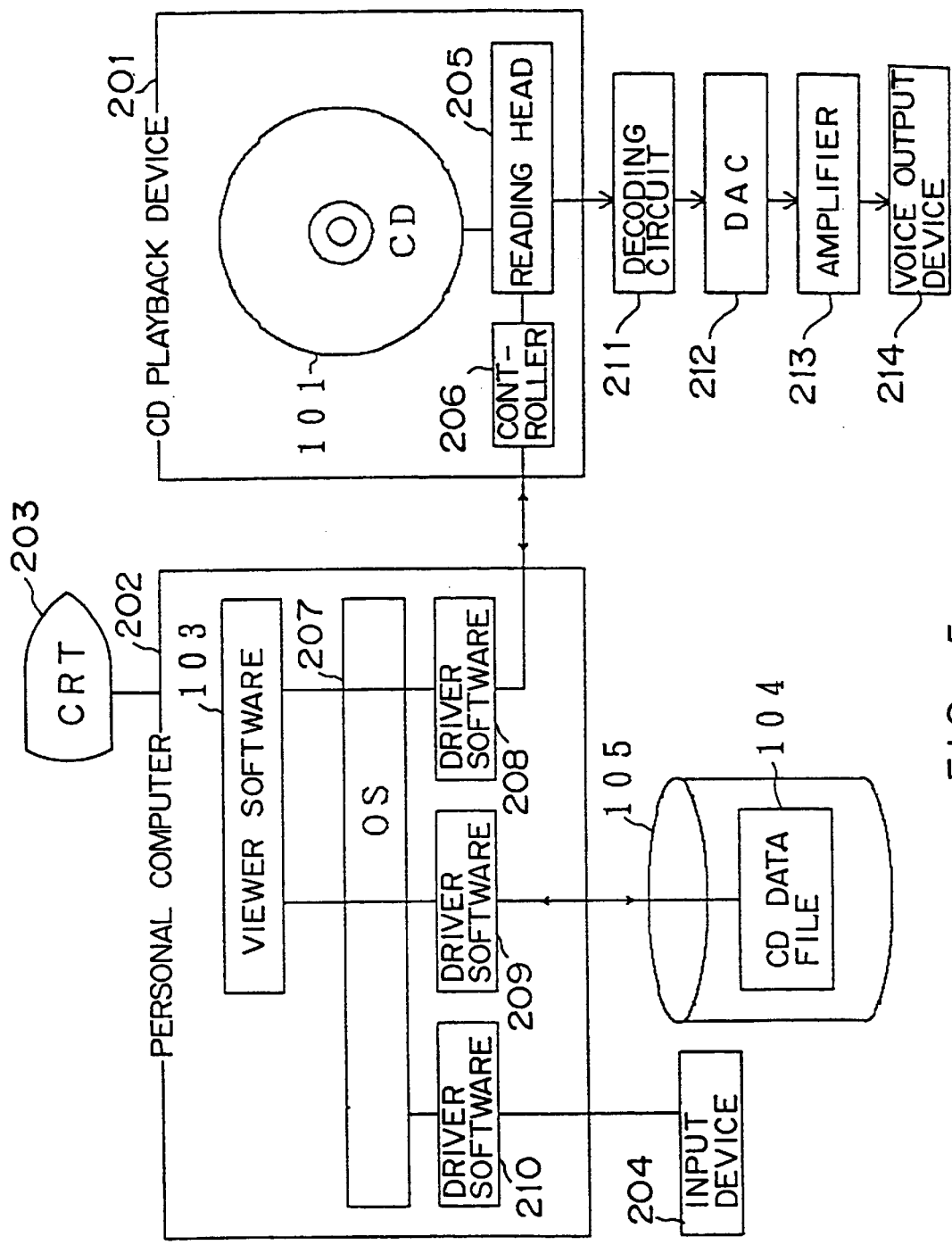
FIG. 5 shows the installation procedure.

That is, according to the present embodiment, the viewer software 103 stored in the CD-ROM 102 is loaded by an installation program, together with the CD data file 104,etc. storing the added information for the music CD 101, onto the hard disk 105 built in the hard disk device 105, that is, an auxiliary storage device (refer to FIG. 5). The loaded viewer software 103 controls the playback of the music CD 101 and the reproduction of the data in the CD data file 104. That is, a system equipped with only one CD playback device can simultaneously process the data stored in the music CD 101 and the CD-ROM 102. Since a file is packed in the CD-ROM 102 for use in playing back the music CD 101 as described above, the user can easily realize a sound reproduction/display system if he or she is provided with necessary hardware.

If the CD data file 104 is stored on a storage medium other than a CD such as a mini disk (MD), then the above described CD data file 104 need not be loaded.

When activated, the viewer software 103 stored in the auxiliary storage device 105 reads the TOC data in the read-in area of the music CD 101 and loads it onto the main storage device 106. The information obtained from the TOC data is compared with the music CD identification data stored in the CD data file 104 to identify what music pieces the music CD 101 stores. The identified music CD 101 is played back and the data corresponding to the music CD 101 is retrieved from the CD data file 104 to copy the contents retrieved from the CD data file 104 to the main storage device 106. Then, processes are performed by, for example, displaying the contents of the CD data file 104 in synchronism with the playback of the music CD 101. Thus, if the music CD 101 is loaded onto a CD playback device, then the CD playback device 201, the contents of the CD data file 104 are directly copied to the main storage device 106 to display on a CRT 203 on real time the added information corresponding to the sound data being reproduced in synchronism with the reproduction of the sound data of the music CD by reading the contents of the CD data file 104 from the main storage device 106.

Figure 4:
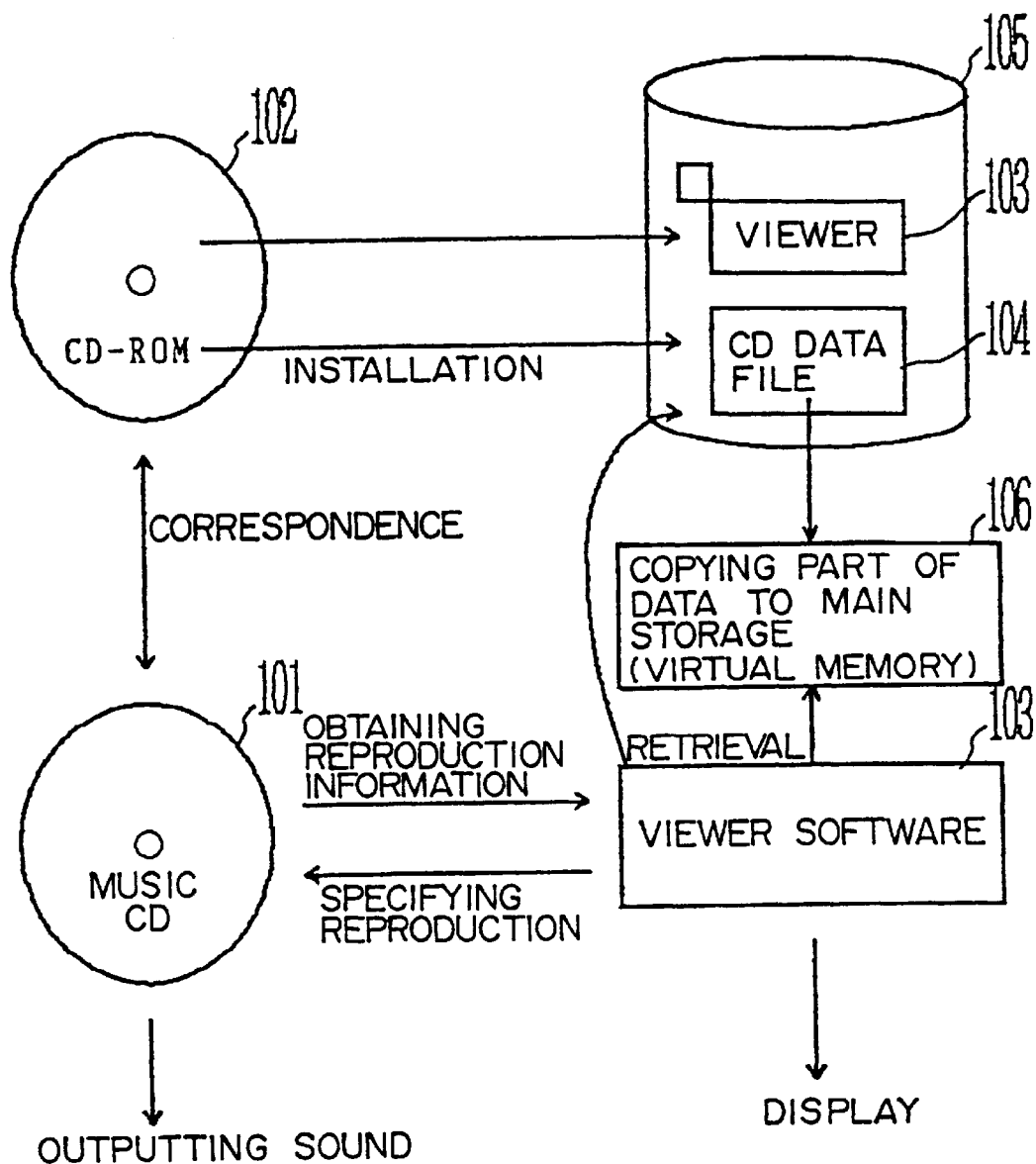
FIG. 4 is a block diagram showing the configuration of the system according to the embodiment of the present invention.

FIG. 4 is a block diagram showing the configuration of the sound reproduction/display system according to the present embodiment. As shown in FIG. 4, the sound reproduction/display system consists of the CD playback device 201 whose holder unit is loaded with the music CD 101 and CD-ROM 102; a personal computer 202; a CRT 203 driven by the personal computer 202 to display an image on the screen; an input device 204 provided with a pointing device (for example, a mouse), etc. to input various data; the auxiliary storage device 105 for storing the above described CD data file 104, etc.

The CD playback device 201 consists of a reading head 205 for reading the storage data from the music CD 101 and CD-ROM 102 and a controller 206 for driving the reading head 205 according to an instruction control signal from the personal computer 202.

With the above described configuration, the controlling operation is performed by the viewer software 103 as follows.

When activated by the CPU of the personal computer 202 not shown in the attached drawings, the viewer software 103 controls the controller 206 of the CD playback device 201 through the OS 207 and driver software 208 to allow the reading head 205 to read the TOC data in the read-in area of the music CD 101 loaded onto the CD playback device 201. The TOC data is transmitted to the personal computer 202 through the controller 206.

The viewer software 103 in the personal computer 202 receives the TOC data through the driver software 208 and OS 207, and stores it in the main storage device 106. Then, it extracts the information for use in identifying the music CD from the TOC data. The contents of the CD data file 104 in the auxiliary storage device 105 is read through the OS 207 and a driver software 209 to retrieve the data matching the identification information of the music CD 101. If any matching data is detected in this retrieving operation, then the above described music CD 101 is identified based on the CD type for the data. Upon completion of the identification, the viewer software 103 reads the added information for the identified music CD 101 from the CD data file 104 of the auxiliary storage device 105, and stores it in the main storage device 106. A part of the added information stored in the main storage device 106 is displayed on the screen of the CRT 203.

Upon receipt of an instruction to playback the music CD 101 identified after being input from the input device 204 through a driver software 210 and the OS 207, the viewer software 103 controls the CD playback device 201 through the driver software 208 and plays back the identified music CD 101. That is, the viewer software 103 controls the controller 206 of the CD playback device 201 through the driver software 208 to allow the reading head 205 to read the digital audio data read from the music CD 101 and interleaved and stored.

The digital audio data read by the reading head 205 is decoded by a decoding circuit 211. The decoded digital audio data is converted into an analog audio signal by a DAC 212. The audio signal is amplified by an amplifier 213 and input to a sound output device 214. The sound output device 214 is, for example, a speaker, or a headphone, and outputs the above described analog audio signal as voice.

As described later, the added information contains the album information, artist information, information about each music piece (for example, the synchronization information containing the introduction to each music piece, words, translation, and pronunciation of each phrase of the music). The CD data file 104 contains the reproduction point information (for example, phrase starting time and phrase ending time) to easily specify the reproduction point.

The reproduction point information is linked with the corresponding words in the original language, translation, and pronunciation of the words, etc. According to the reproduction point information, the viewer software 103 controls the CD playback device 201 and CRT 203 such that the music CD 101 can be played back in synchronism with the display of the corresponding information in phrase unit.

Described above is the outline of the control of the viewer software 103.

The file loaded by the installation program from the CD-ROM 102 to the auxiliary storage device 105 is described as follows.

Figure 6:
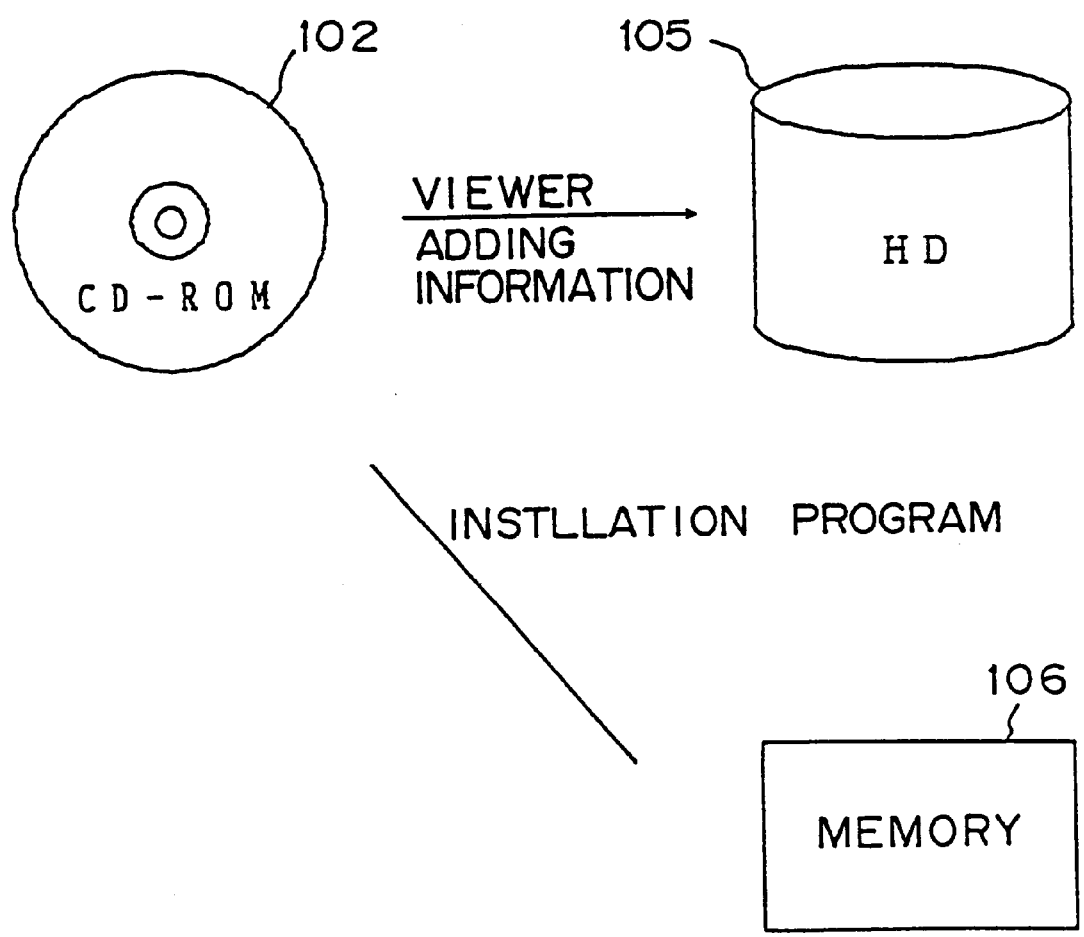
FIG. 6 shows the file management according to the embodiment of the present invention.

When the installation program written from the CD-ROM 102 to the main storage device 106 in the personal computer 202 is activated with the CD-ROM 102 loaded onto the CD playback device 201, the installation program allows each file stored in the CD-ROM 102 is moved to a hard disk 105a stored in the auxiliary storage device 105 (refer to FIG. 5). FIG. 6 shows the management of the file stored in the auxiliary storage device 105.

As shown in FIG. 6, the auxiliary storage device 105 is loaded with a system management file 301, a text file 302, and an image file 303 in addition to the above described viewer software 103 and CD data file 104 from the CD-ROM 102. Furthermore, the uninstallation program (not shown in the attached drawings) is stored in the auxiliary storage device 105 by the installation program in addition to the above listed files. Thus, the CD-ROM 102 stores various files as a set of database.

The system management file 301 is stored by the installation program in a specified area in the auxiliary storage device 105. The system management file 301 corresponds to the root directory of the various files loaded onto the auxiliary storage device 105 from the CD-ROM 102, and stores the management information about the files storing the viewer software 103 and various files in the CD data file 104.

Figure 7:
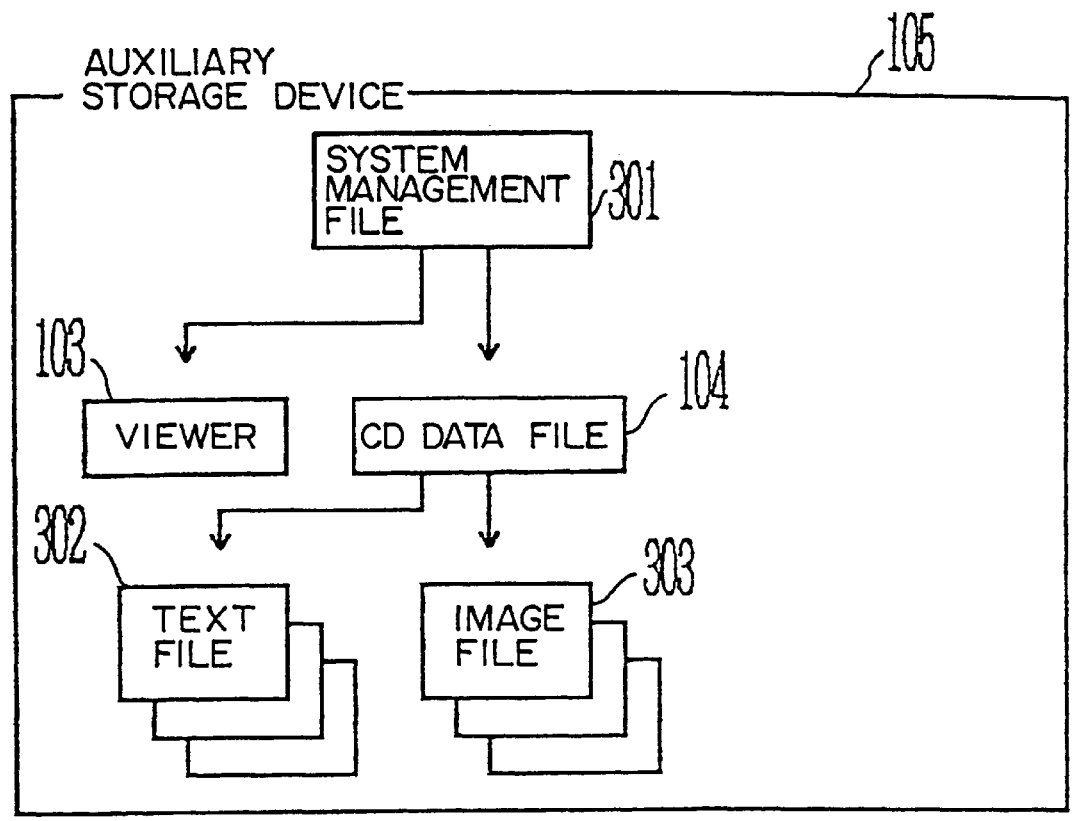
FIG. 7 shows the structure of the system management file according to the embodiment of the present invention.

FIG. 7 shows the data structure of the system management file 301

An identifier 311 is used when the viewer software 103 identifies the system management file 301. The name 312 of an auxiliary storage device at the installation point is the name of the auxiliary storage device 105 in which the viewer software 103 and CD data file 104 are installed. The storage position information 313 of the file in the auxiliary storage device 105 refers to the name of the directory to which the viewer software 103 and CD data file 104 belong, and is required when the file storage position in the auxiliary storage device 105 is obtained.

The version information 314 of the viewer software 103 refers to the version number of the viewer software 103. The file name 315 of the viewer software 103 refers to the name of the file containing the viewer software 103, that is, the information pointing to the storage position. Since the viewer software 103 may be updated, the version of the viewer software 103 is constantly managed.

According to the present embodiment, a plurality of CD data files 104 can be entered to the auxiliary storage device 105. A CD data volume information 316 refers to the total number of the CD data file 104 entered to the auxiliary storage device 105.

The CD data volume information 316 is followed by a CD data name 317, a version number 318, and a file name 319 to be stored for all CD data files 104 entered to the auxiliary storage device 105. The CD data name 317 refers to a name assigned to each CD data file 104. The version number 318 refers to a version number of the CD data file 104 which may also be updated. The file name 319 refers to the storage position of the CD data file 104 having the above described CD data name 317.

The viewer software 103 reads the object CD data file 104 from the auxiliary storage device 105 according to the name 312 of the auxiliary storage device at the installation point, the storage position information 313 of the file in the auxiliary storage device 105, and the file name 319 of the CD data file 104.

When the CD-ROM 102 loaded with the viewer software 103 of a new version is mounted in the CD playback device 201, the contents of the system management file 301 are rewritten by the installation program in the CD-ROM 102. That is, the version information 314 of the viewer software 103, the file name 315 of the viewer software 103, CD data volume information 316, etc. are updated, and the CD data name 317, the version number 318, and the file name 319 of the new CD data file 104 are added.

Thus, each time the CD playback device 201 is loaded with the CD-ROM 102 storing the viewer software 103 of a new version, the viewer software 103 is updated and the new CD data file 104 is added.

FIG. 7 shows the state in which the installation is performed three times by the installation program stored on the three variations of CD-ROM 102. The three CD data files 104a through 104c shown in FIG. 7 refer to different CD data names 317. The viewer software 103 can use the CD data file 104 of a version older than its own version. These three CD data files 104a through 104c are integrated and managed as a set of database using the system management file 301. The installation program loads only the CD data file 104 having a different CD data name 317 of the latest version number 318 onto the auxiliary storage device 105 by referring to the CD data name 317 in the system management file 301 and the version number 318 of the CD data file 104, and then adds the file to the database. When the CD data file 104 is added, the CD data volume information 316 is simultaneously updated.

The installation program refers to the version information 314 of the viewer software 103 in the system management file 301 and the file name 315 of the viewer software 103 to update the viewer software 103. That is, if the viewer software 103 having a number older than the version number of the viewer software 103 in the CD-ROM 102 storing the installation program is stored in the auxiliary storage device 105, then the viewer software 103 of a version newer than that stored on the CD-ROM 102 is stored in the auxiliary storage device 105 so that the version information 314 of the viewer software 103 of the system management file 301 is updated to the new version number. If the file name (storage position) of the newly loaded viewer software 103 is different from that of the older version, then the file name 315 is also updated to a new file name.

Figure 8:
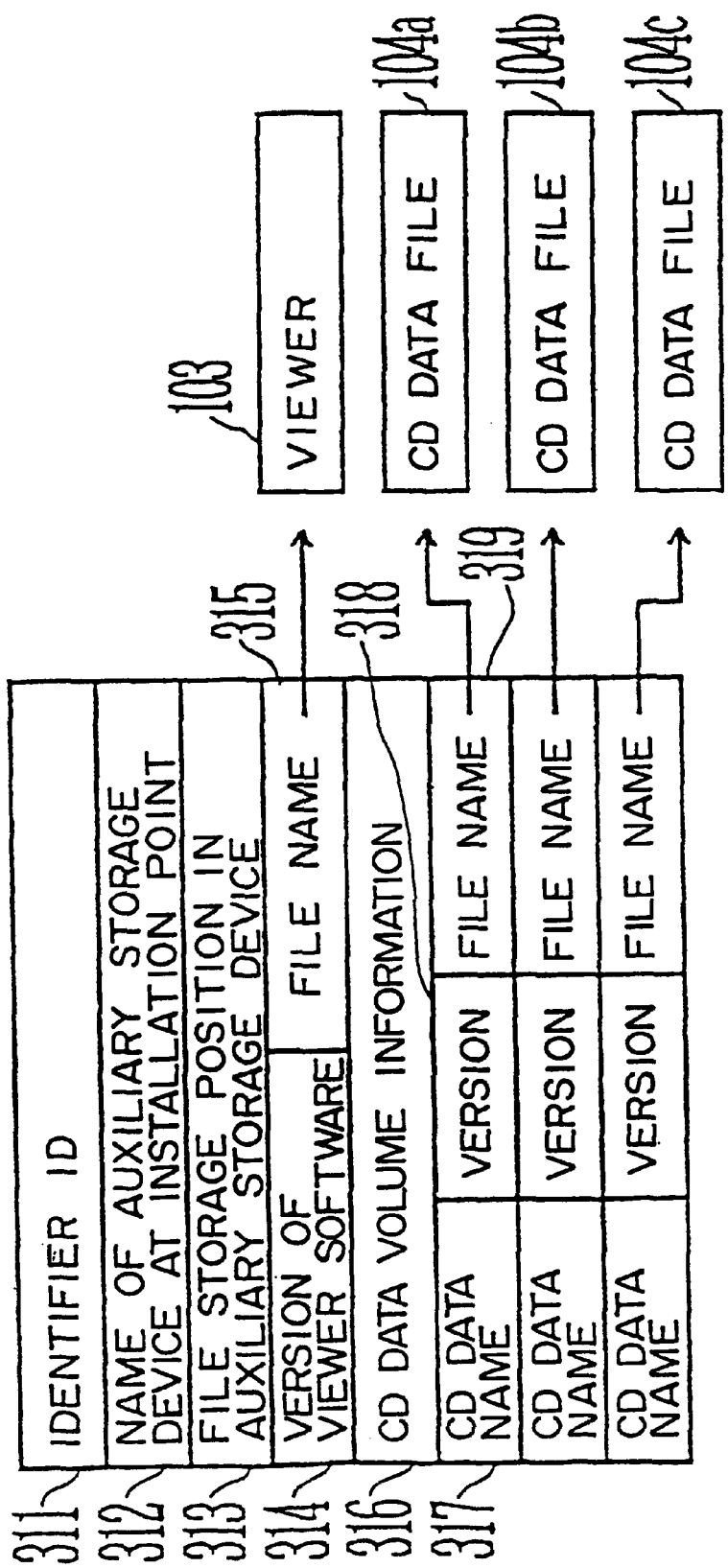
FIG. 8 shows the contents of the CD data file according to the embodiment of the present invention.

FIG. 8 shows the contents of the CD data file 104.

The CD data file 104 stores CD information 330 shown by (a) in FIG. 8; artist information 340 shown by (b) in FIG. 8; and music information 350 shown by (c) in FIG. 8. The information 330 through 350 is represented by the data consisting of a plurality of items and stores the storage position information, as the file name 315, for the text file 302 or the image file 303 depending on the type of the information.

The CD information 330 stores the file names 315 of the jacket photo files of the music CDs 101 stored as CD photo information 335, that is, the image files 303, and the file names 315 of the album information files stored as CD album information 336, that is, the text files 302.

The artist information 340 stores the file names 315 of the artist information files stored as artist information 343, that is, the text file 302, and the file names 315 of the artist photo files stored as photo information 344, that is, the image file 303.

Furthermore, the music information 350 stores the word file as word information 358, that is, the text file 302.

The CD information 330 stores the total performance time and total number of music pieces stored on the music CD 101 as CD total performance time information 337 and CD music piece number information 338 respectively. The music information 350 is provided for each music piece recorded on the music CD 101, and the performance time of each music piece is stored as performance time 357. The CD total performance time information 337, CD music piece number information 338, and the performance time 357 are used as the information in identifying the music CD 101.

As described above, the viewer software 103 and CD data file 104 are managed in the auxiliary storage device 105 by the system management file 301. The CD data file 104 produces the database in the hierarchical structure in which the text file 302 and image file 303 are managed. The CD data file 104 consists of a plurality of text files 302 and image files 303.

The viewer software 103 reads the CD data file 104 by referring to the system management file 301, and reads the text file 302 or the image file 303 by referring to the CD data file 104.

The contents of the CD data file 104, text file 302, and image file 303 are selected and displayed depending on each mode.

The present embodiment presents an artist information display mode, a word display mode, a music information display mode, and a discography mode as the modes in which display items are specified.

FIG. 9 shows the state of the display screen in each of the above listed modes and in the transition between the modes. In FIG. 9, a display screen 401 corresponds to the artist information display mode and the music information display mode. A display screen 402 corresponds to the word display mode, and a display screen 403 corresponds to the discography mode.

Each of the above described display screens 401 through 403 are formed by three areas, that is, a command area 404 positioned above; a selection list area 405 positioned on the left; and an information area 406 other than those areas.

The command area 404 is formed by a title display box 404a in which the title of the music CD 101, the title of the music being played back, etc.; a CD operation box 404b in which the operation buttons for the music CD 101 such as playback, stop, fast-forwarding, rewinding, etc. are displayed; and a mode setting box 404c in which various mode setting buttons are displayed (these boxes are not shown in the attached drawings). According to the present embodiment, clicking the setting button for each mode in the mode setting box 404c switches the present mode into the mode assigned to the clicked button.

The selection list area 405 is a selection list box in which a list of the music pieces stored on the music CD 101 is displayed. The user can specify the playback of music by clicking the mouse after moving the mouse cursor to the corresponding item displayed on the list. The selection list area 405 displays not only a list of the music pieces stored on the music CD 101 but also the music pieces of a specified artist.

The last information area 406 displays a general purpose information display area in which words, translation, the pronunciation of the translation (hereinafter referred to as the word information (data) are displayed when, for example, the word display mode is set. In the word display mode, the information area 406 is divided into a plurality of word areas 4061 (8 areas in FIG. 9) to display the word information in each word area 4061.

Figure 10:
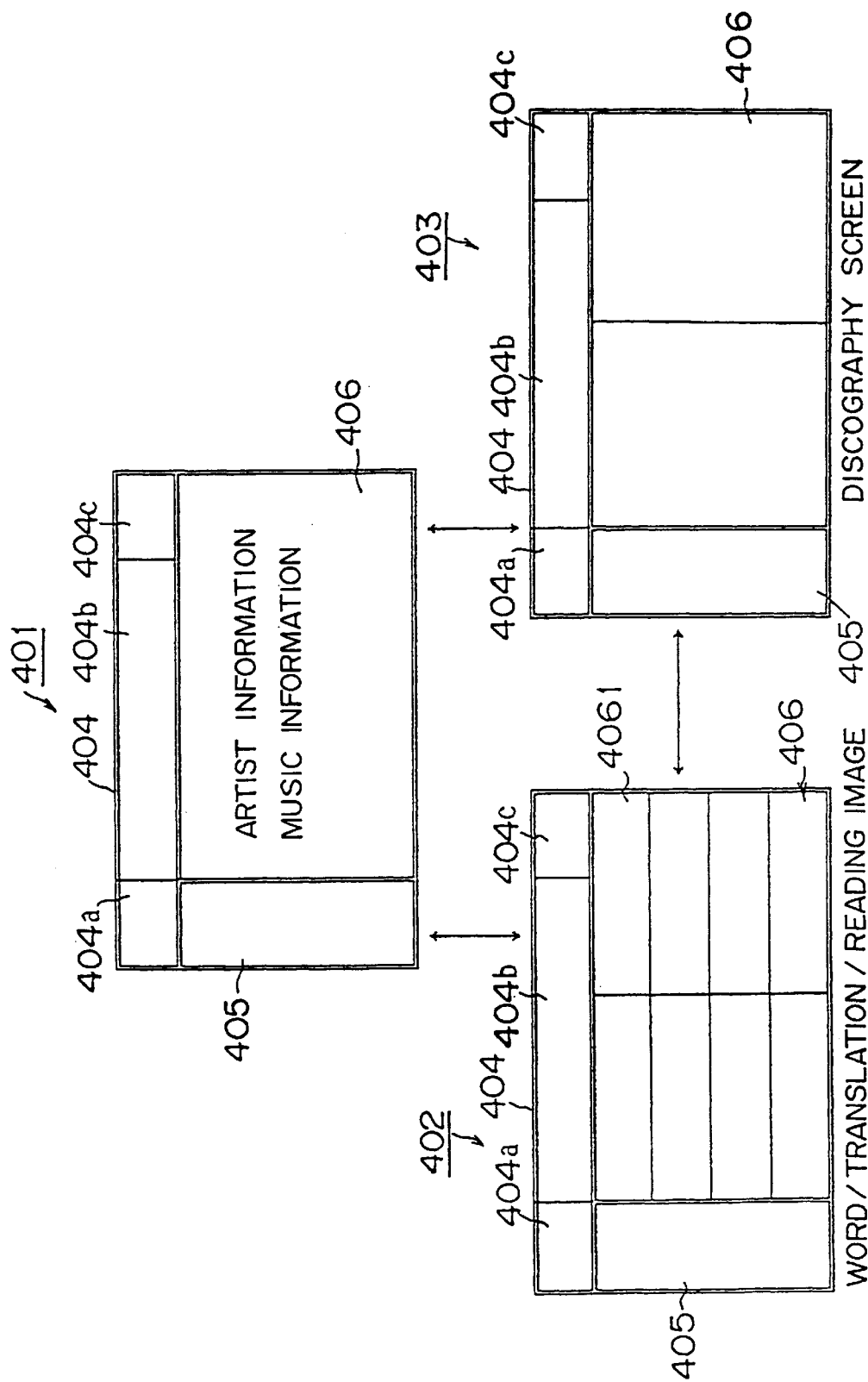
FIG. 10 shows the display format of the artist and music information.

FIG. 10 shows the display format of the data displayed in the artist information display mode and the music information display mode. In these modes, the following data is displayed in the information area 406.

| Artist Information/Music Information Mode | |
| --- | --- |
| Artist Information | |
| Name of Artist | Agent to which the artist Picture of Artist belongs |
| Explanation about Artist | Gender Birthday/Blood Type |
| Music Information | |
| Title of Music | Copyright |
| Original Publisher | Sub-publisher |
| Photo of Jacket | Explanation of Music |
| Composer | Song Writer |
| Recomposer | |
| Recording Company | Type of Record (CD) |
| Number of Recording Company | Label |
| Publishing Date | Price |
| Annihilated/Not annihilated | |

A foreign artist is described with "the title of the artist", "title of the music", "title of the album", and "list of the contents of the album" in both original and translated-into languages.

Figure 11:
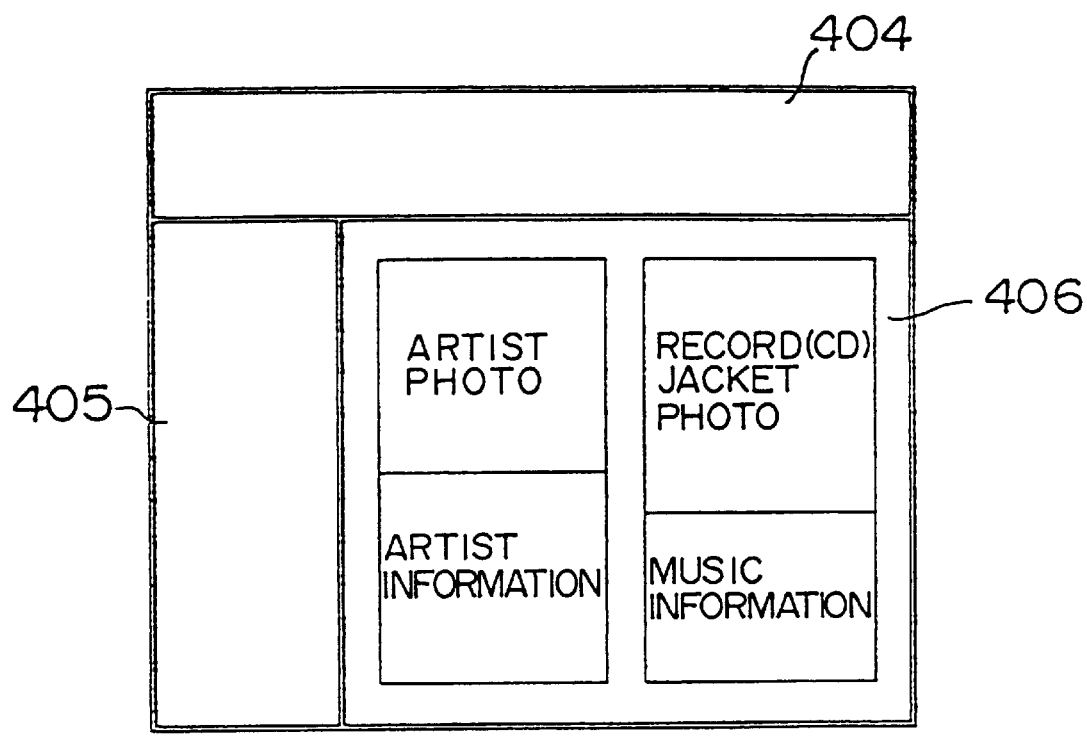
FIG. 11 shows a display format of the words displayed in the word area.
Figure 12A:
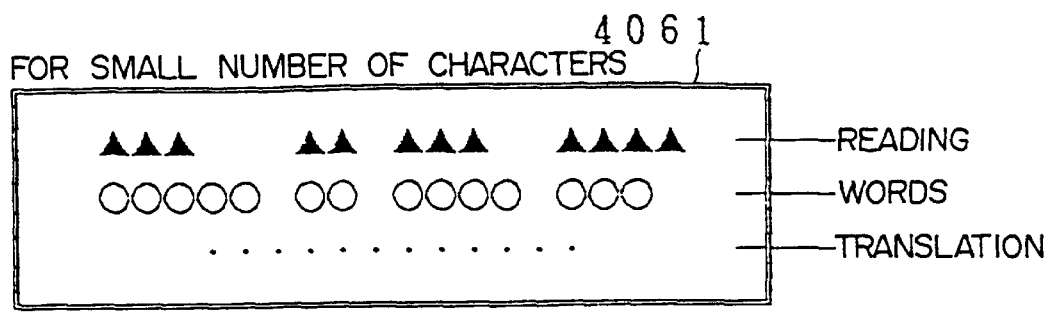
FIG. 12 shows an example of the display of the word area.
Figure 12B:
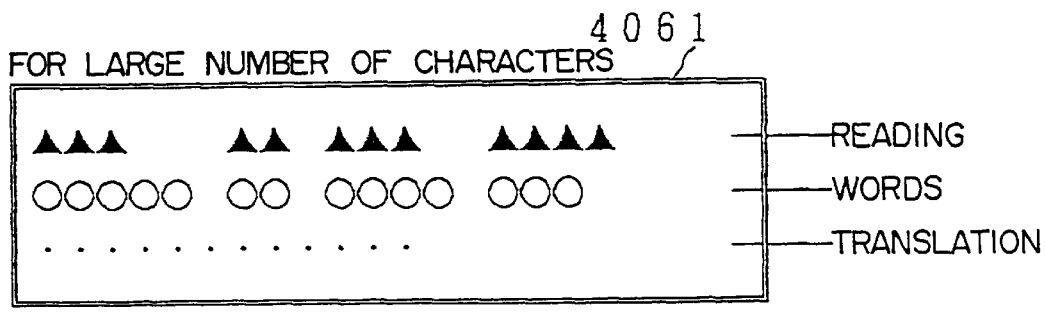
Figure 13:
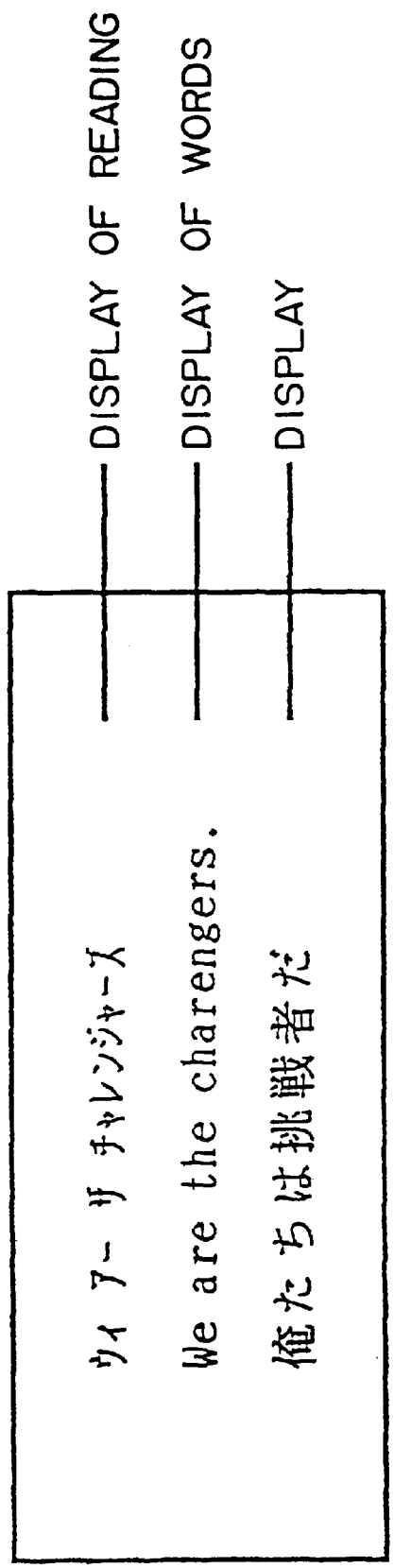
FIG. 13 shows another display format in the word display mode.

FIG. 11 shows the display format of the word information displayed in the word area 4061 in the word display mode. The word information is centrally displayed in the word area 4061 as shown by (a) in FIG. 11 when a small number of characters are displayed. If a large number of characters are displayed, they are left-justified as shown by (b) in FIG. 11. so that the largest possible number of characters can be displayed in the word area 4061. The word information consists of words, translation, and pronunciation, and the displayed items can be selected by clicking a predetermined button (not shown in the attached drawings) in the command area 404. FIG. 12 shows an example of the display in the word area 4061. FIG. 13 shows another display format in the word display mode. The data displayed in the word display mode are listed below.

| Word/Translation/Pronunciation Display Mode | |
| --- | --- |
| Artist Information | |
| Name of Artist | |
| Music Information | |
| Title of Music | Copyright |
| Original Publisher | Subpublisher |
| Composer | Song Writer |
| Recomposer | |
| Words | Pronunciation Translation |

A foreign artist is described with "the title of the artist", "title of the music", "title of the album", and "list of the contents of the album" in both original and translated-into languages.

Figure 14:
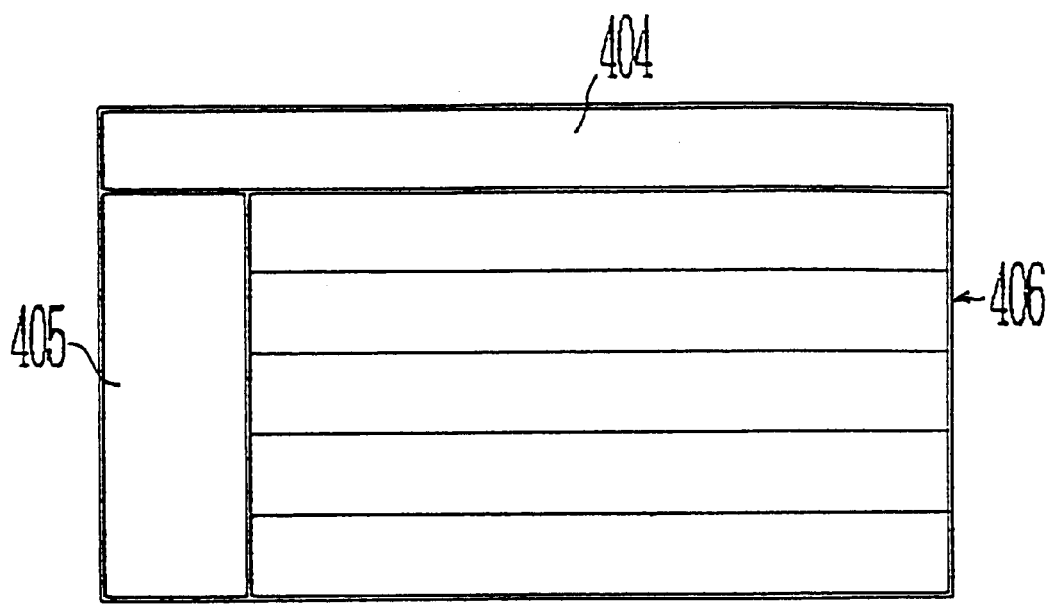
FIG. 14 shows the displayed data and the format in the discography mode.

FIG. 14 shows the display format of the data to be displayed in the discography mode. In the format shown in FIG. 14, the selection list area 405 as well as the information area 406 is used as a data display area. The data displayed in this mode are listed below.

| Discography Mode | |
| --- | --- |
| Artist Information | |
| Name of Artist | |
| Album Information | |
| Name of Album | List of Music Pieces in the Album |
| Photo of Jacket | Copyright |
| Original Publisher | Subpublisher |
| Recording Company | Type of Record (CD) |
| Number of | Label |
| Recording Company | Price |
| Publishing Date | |
| Annihilated/Not annihilated | |

A foreign artist is described with "the title of the artist", "title of the music", "title of the album", and "list of the contents of the album" in both original and translated-into languages.

As described above, the user can easily obtain various information about the music CD 101 from the display of the CRT 203 by storing the data of the music CD 101 in the CD playback device 201.

Next, the operations of the viewer software 103 are described in detail by referring to the flowchart.

FIG. 16 is a flowchart showing the activation of the system according to the embodiment of the present invention. The entire operation of the viewer software 103 is explained below by referring to the flowchart shown in FIG. 16.

The viewer software 103 stored in the auxiliary storage device 105 is activated after being loaded by the OS 207 from the auxiliary storage device 105 onto a specified area in the main storage device 106 (not shown in the attached drawings) by, for example, inputting a predetermined command from the input device 204 or clicking the mouse for a predetermined icon displayed on the screen of the CRT 203 (S101). The activated viewer software 103 determines through the driver software 208 whether or not the music CD 101 has been mounted in the CD playback device 201 (S102). The viewer software 103 repeats the determination until the music CD 101 is mounted in the CD playback device 201. While the determination is repeatedly made, the instruction message to mount the music CD 101 is displayed on the CRT 203.

When the music CD 101 is mounted in the CD playback device 201, the viewer software 103 recognizes it through the driver software 208, and starts the process in step S103.

In step S103, the viewer software 103 reads the TOC data on the music CD 101 mounted in the CD playback device 201 through the driver software 208, and stores the data in the main storage device 106. Then, it extracts each piece of data, that is, the total performance time, total number of music pieces, and performance time of each music piece, from the TOC data stored in the main storage device 106. The viewer software 103 then compares the data with the identification information used in identifying the music CD 101 sequentially read from the CD data file 104 through the driver software 208, and identifies the type of the music CD 101 set in the CD playback device 201 (S103).

Figure 17:
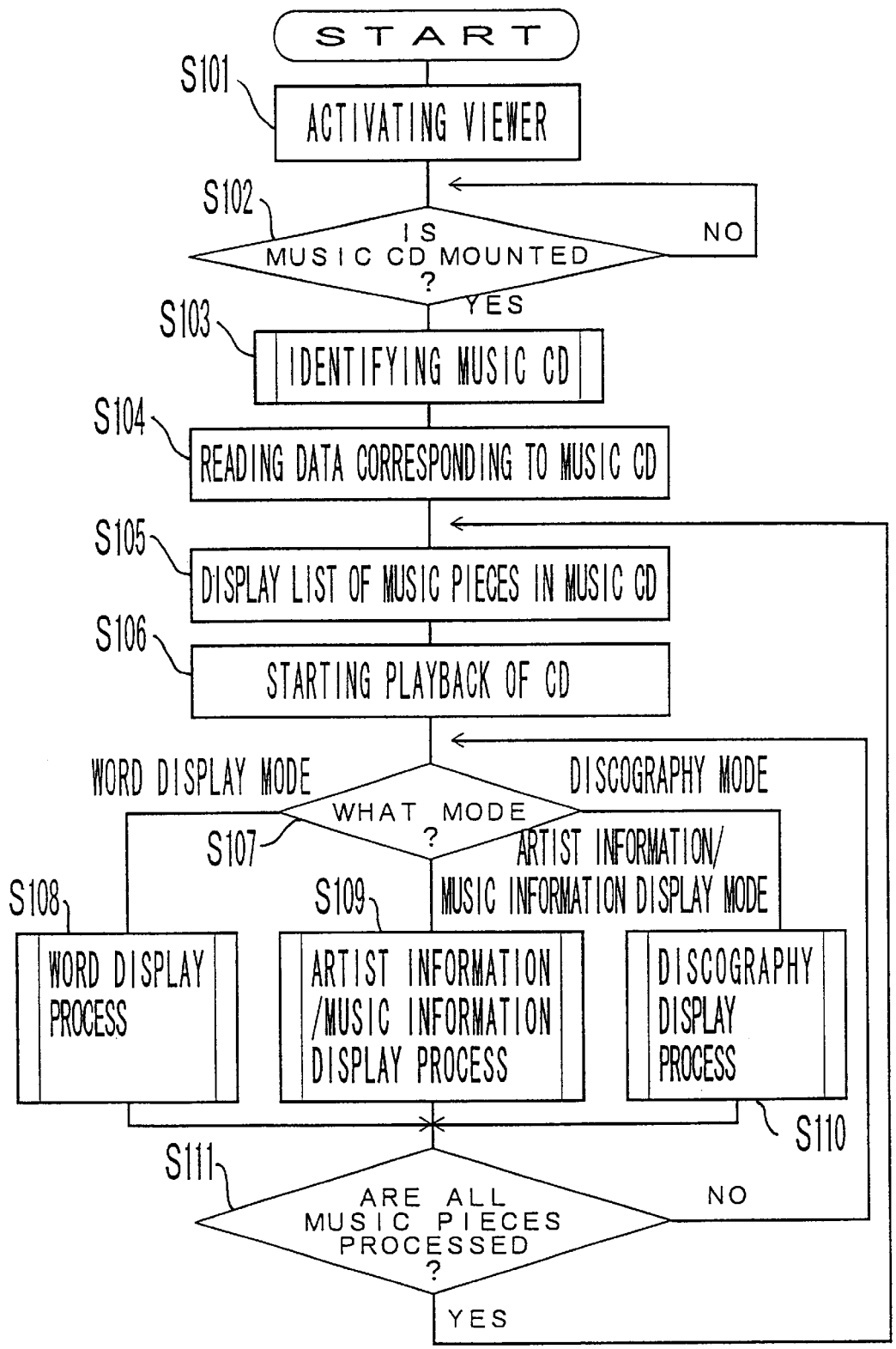
FIG. 17 is a flowchart showing the music CD identifying process according to the embodiment of the present invention.

The identifying process performed on the music CD 101 in step 103 is described in detail by referring to the flowchart shown in FIG. 17.

In this process, the total performance time, total number of music pieces, and performance time of each music piece are extracted from the TOC data stored in the main storage device 106. The information is defined as key data (S201).

Then, a data file matching the above described mounted music CD 101 in total performance time within allowable tolerance is searched for in all CD data files 104 stored as a set of database (S202). In this search, the CD total performance time information 337 (refer to (a) in FIG. 8) classified in the CD information 330 is read from each of the CD data files 104 of all CD data names 317 entered in the system management file 301 as shown in FIG. 7. The read value is compared with the total performance time of the music CD 101. After the search, it is determined whether or not there is any CD data file 104 (CD data name 317) matching the music CD 101 in total performance time within allowable tolerance (S203). The allowable tolerance is, for example, ±1.

If "NO", that is, if it is determined in step S203 that there is no CD data file 104 (CD data name 317) matching the music CD 101 in total performance time within allowable tolerance, then the determination is displayed on the screen of the CRT 203 and the process terminates immediately. In this case, for example, the message is displayed on the screen of the CRT 203 to instruct the user to mount another music CD 101 until another music CD 101 is mounted in the CD playback device 201 (abnormal termination).

If "YES", that is, if it is determined in step S203 that there is a CD data file 104 (CD data name 317) matching the music CD 101 in total performance time within allowable tolerance, then the CD data file 104 (CD data name 317) matching the music CD 101 in total number of music pieces is searched for in the determined CD data file 104 (S204), and then it is determined whether or not there is any CD data file 104 (CD data name 317) matching the music CD 101 in total number of music pieces (S205). In the search in step S204, the CD music piece number information 338 (refer to (a) in FIG. 8) classified in the CD information 330 is read from each of the CD data files 104. The read value is compared with the total number of music pieces of the music CD 101.

If "NO", that is, if it is determined in step S205 that there is no CD data file 104 (CD data name 317) matching the music CD 101 in total number of music pieces, then the determination is displayed on the screen of the CRT 203 and the process terminates immediately. In this case, for example, the message is displayed on the screen of the CRT 203 to instruct the user to mount another music CD 101 until another music CD 101 is mounted in the CD playback device 201 (abnormal termination).

If "YES", that is, if it is determined in step S205 that there is a CD data file 104 (CD data name 317) matching the music CD 101 in total number of music pieces, then the CD data file 104 (CD data name 317) matching the music CD 101 in performance time of each music piece within allowable tolerance (for example, ±) is searched for in the determined CD data file 104 (S206), and then it is determined whether or not there is any CD data file 104 (CD data name 317) matching the music CD 101 in performance time of each music piece within allowable tolerance (S207). The music information 350 about the CD data file 104 is given for each music piece, and the performance time is stored as a part of the performance time 357. In the search in step S206, the performance time of the music in each of the CD data files 104 is compared with that having the same music number in the music CD 101.

If "NO", that is, if it is determined in step S207 that there is no CD data file 104 (CD data name 317) matching the music CD 101, then the determination is displayed on the screen of the CRT 203 and the process terminates immediately. In this case, for example, the message is displayed on the screen of the CRT 203 to instruct the user to mount another music CD 101 until another music CD 101 is mounted in the CD playback device 201 (abnormal termination).

If "YES", that is, if it is determined in step S207 that there is a CD data file 104 (CD data name 317) matching the music CD 101, then it is determined whether or not the currently retrieved music piece is the last music piece of the music CD 101, that is, it is determined whether or not the comparison has been completed for all music pieces (S208). If the music piece being searched is not the last music piece ("NO" in S208), control is returned to step S206, and the processes in steps S206 through S207 are performed on the next music piece.

Thus, the CD data file 104 (CD data name 317) matching the music CD 101 in performance time of all music pieces within allowable tolerance is searched for. That is, all the CD data files 104 (CD data name 317) matching the music CD 101 in performance time of all music pieces within allowable tolerance are retrieved by repeating the processes in steps S206 through S208.

If the determination is completed on all CD data files 104 (CD data name 317) in step S208 as to whether or not they match the music CD 101 in performance time of all music pieces ("YES" in S208), then it is determined whether or not there is only one CD data file 104 (CD data name 317) matching the music CD 101 in total performance time (S209). If there are two or more CD data files 104 (CD data names 317) ("NO" in S209), then the user is notified of the determination and the process terminates. In this case, the message is displayed on the screen of the CRT 203 to instruct the user to mount another music CD 101 until another music CD 101 is mounted in the CD playback device 201 (abnormal termination).

If it is determined that there is only one CD data file 104 (CD data name 317) matching the music CD 101 in performance time of each music piece within allowable tolerance in step S209 ("YES" in S209), the CD data name 317 of the CD data file 104 is stored in the main storage device 106 as an identifier for use in accessing the CD data file 104 corresponding to the identified music CD 101, and the process terminates (normal termination). In this case, the process in step S104 is performed as shown in FIG. 16.

It is rarely that the music CD 101 matches another music CD completely in total number of music pieces, total performance time, and performance time of each music piece within allowable tolerance. The matching probability is very low. Therefore, according to the process shown by the flowchart in FIG. 17, the music CD 101 mounted in the CD playback device 201 can be exactly identified.

For the reasons of the manufacture management and technology, the music CD 101 is not uniform in the storage state of music, that is, sound data. The range of non-uniformity may depend on the manufacturers (factories, etc.). The non-uniformity prevents the music CD 101 from being exactly identified in determining whether or not the music CD 101 matches another CD in total performance time and performance time of each music piece. Actually, many music CDs 101 cannot be exactly identified. However, the present embodiment can determine the matching if the comparison data indicate allowable tolerance in searching for the CD data file 104 (CD data name 317) matching the music CD 101 in total performance time and performance time of each music piece. Therefore, the above described trouble can be prevented and the music CD 101 can be correctly identified in comparison with the CD data file 104.

The processes in and after step S104 are described below by referring to FIG. 16.

When the process in step S103 is performed as described above and the music CD 101 mounted in the CD playback device 201 is identified, the added information (data) for the music CD 101 is read from the CD data file 104 according to the identification result (CD data name 317 shown in FIG. 7) and loaded onto the main storage device 106 (S104).

Since the music CD 101 mounted in the CD playback device 201 can be identified as described above, the related added information can be initially prepared in the main storage device 106. Therefore, it is not necessary for the user to select added information corresponding to the music CD 101. Thus, the load on the user can be reduced with the operability improved.

According to the present embodiment, data is written to the main storage device 106 and then each process is performed in order by default to further reduce the load on the operations of the user (unless the user operates a specific mode setting button or any operation button for the CD).

Then, a list of the music pieces stored on the music CD 101 is displayed on the screen of the CRT 203 according to the music information 350 of each music piece loaded onto the main storage device 106 (S105), and the music CD 101 is played back (S106).

Music is played after being selected through the input device 204 from the music pieces on the list displayed on the screen of the CRT 203. The viewer software 103 identifies the music CD 101 mounted in the CD playback device 201, and displays the CD information 330 for a predetermined period in the information area 406. When a music piece to be played is selected, including starting the play from the first music piece, the information about the music piece to be played next is displayed in the information area 406, until the music is played, upon selection of the music piece to be played.

The music CD 101 is played back when the viewer software 103 sends a control command to the CD playback device 201 through the OS 207 and driver software 208. After the viewer software 103 sends the control command (seek instruction), it monitors the start of the playback of the music CD 101 by inquiring of the controller 206 of the CD playback device 201 through the OS 207 and driver software 208 whether or not the music CD 101 has been played back.

In an actual process, the viewer software 103 inquires of the CD playback device 201 the reproduction point information (minute, second, and frame number) of the music CD 101 in each of the specified processes (time), receives the performance time (the reproduction point information indicating what portion of the music CD 101 is being played back), compares it with the time information (minute, second, and frame number) stored in phase unit of words as the added information, and arranges the performance timing of the music CD 101 with the phrases of the words in order to synchronize the display of the added information with the playback of the music CD 101.

When the music is selected as described above, the mode currently selected is determined in step S107. According to the present embodiment, the mode is determined from among the word display, mode, artist display/music information display mode, and discography mode depending on the contents displayed on the CRT 203. In the mode determination in step S107, the current mode is determined from among the word display mode, artist display/music information display mode, and discography mode.

Figure 18:
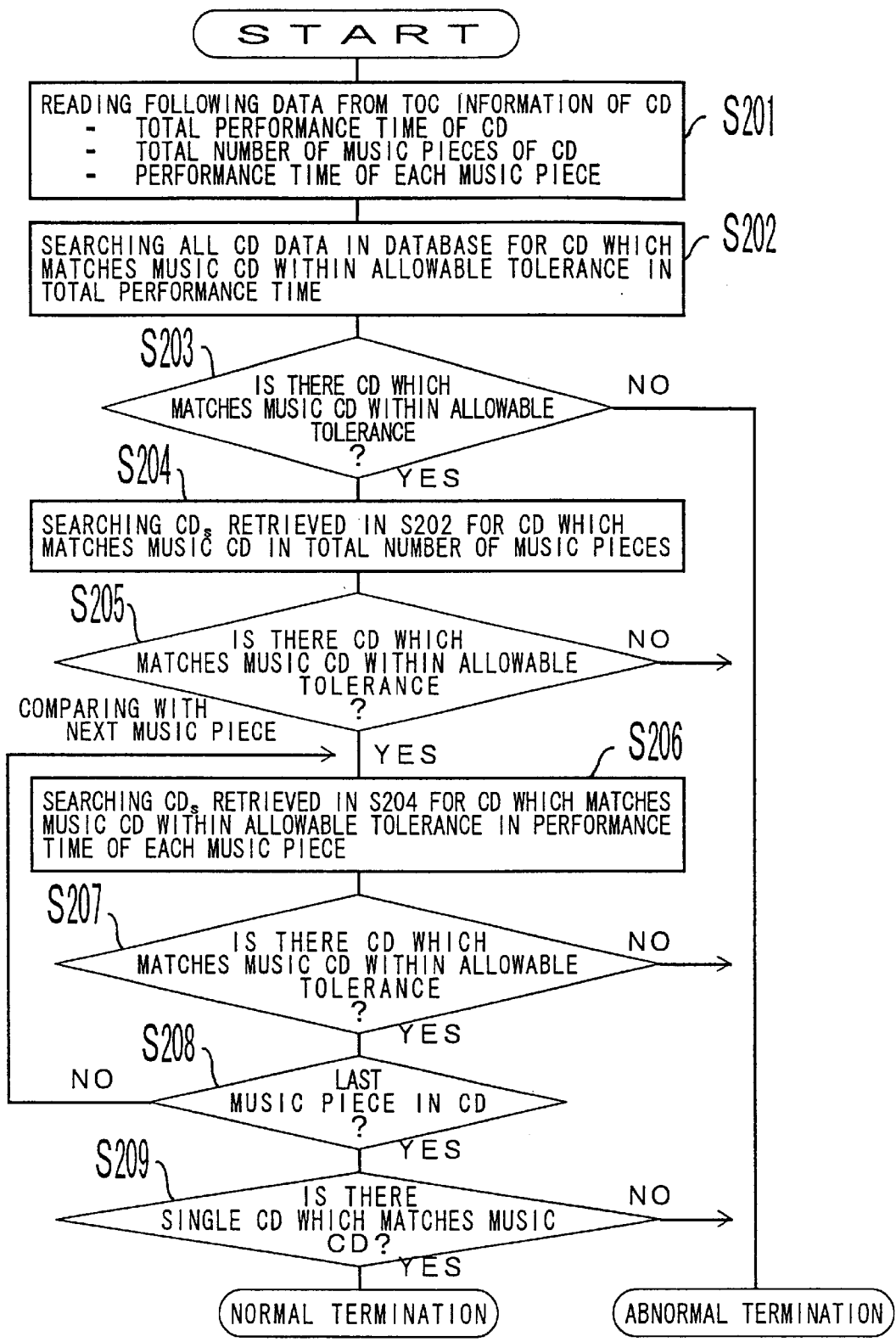
FIG. 18 is a flowchart showing the word display process according to the embodiment of the present invention.

If it is determined in step S107 that the word display mode is entered, a word display process is performed next (S108). FIG. 18 is a flowchart showing the word display process. The word display process is explained below by referring to FIG. 18.

In the word display process, the number of the music piece set in the entire process shown in FIG. 16 and currently played is obtained (S301).

Then, the word data (words, translation, and pronunciation) of the music information 350 corresponding to the obtained number of the music piece is acquired from the added information read from the CD data file 104 corresponding to the music CD 101 currently played back (S302). The word data is stored in the file having a word file name 358, that is, one of the items of the music information 350 in the CD data file 104 (refer to (c) in FIG. 8). The word data stored in the word file (text file) contains words, translation, and pronunciation when the words are written in a foreign language, and contains words and pronunciation if the words are written in Japanese.

When the above described word data is acquired, the data is displayed for one screen in synchronism with the portion of the music piece currently played (S303). Then, the current playback point of the music CD 101, that is, the time (performance time) from the start of the play of the music piece of the number is obtained as the time information (S304). As described above, the time information can be obtained by enquiring the performance time of the music CD 101 of the controller 206 through the OS 207 and driver software 208. The play position of the music currently played refers to the performance point. The performance point refers to the data indicating the present time (minutes and seconds) from the start of the music being played and the present frame. The performance point of the music CD 101 is conventionally obtained from the controller and displayed on the display device.

When the time information (play point) is obtained, the time information (minute, second, and frame number indicating the playback position of the music CD 101) is compared and then synchronized with the phrase start time (minute, second, and frame number) stored (and displayed) as the added information corresponding to the part of the music being displayed and the phrase end time (minute, second, and frame number) with the word data displayed in each word area 4061 as shown on the display screen 402 in FIG. 9. The word area 4061 corresponding to the phrase is highlighted on the display (S305).

Figure 19:
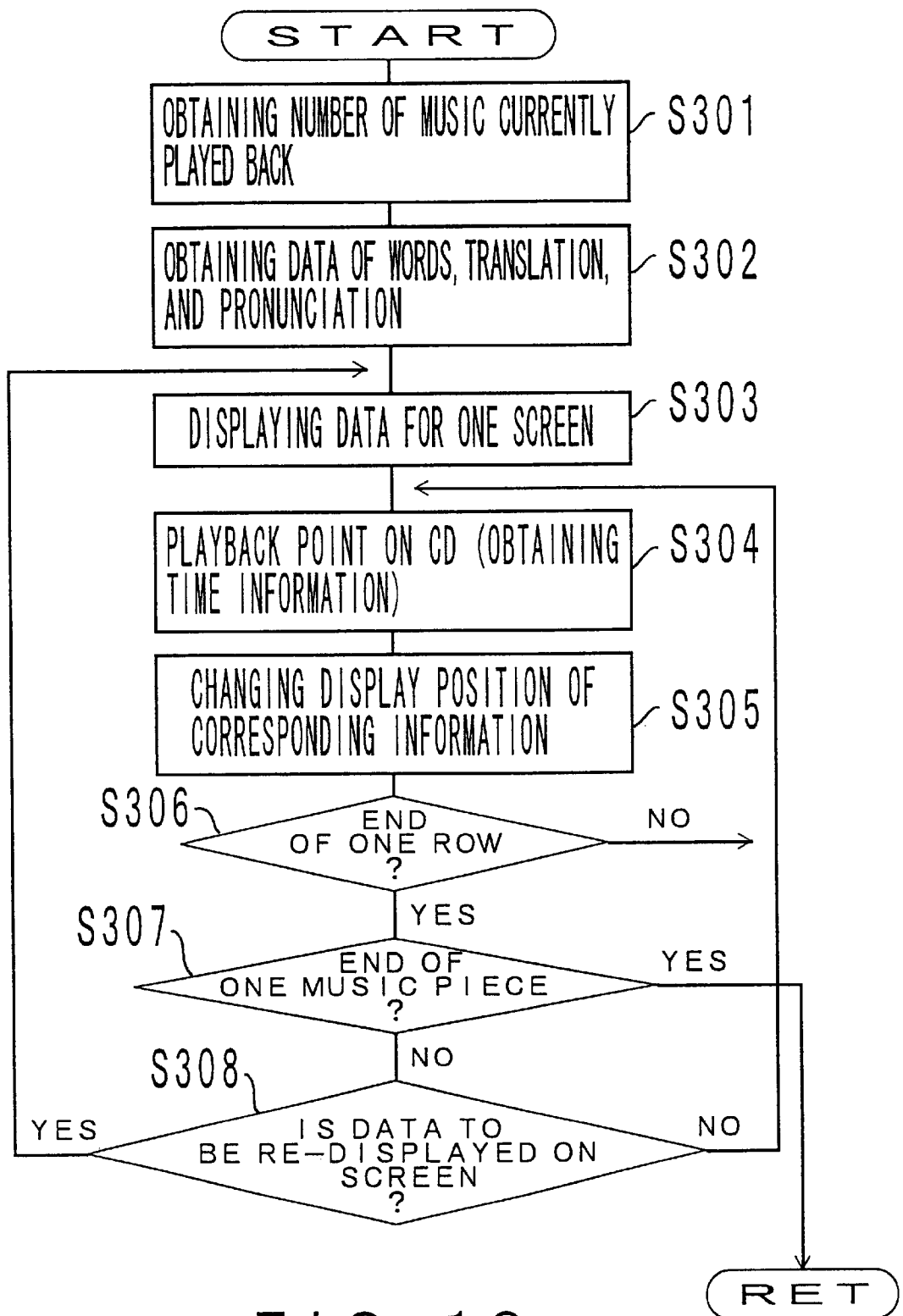
FIG. 19 shows an example of data corresponding to 1 phrase.

When the word information is displayed in each word area 4061 for each phrase, the word information is divided and assigned in phrase unit as described above. Each phrase is linked with the time information about the performance. FIG. 19 shows an example of data corresponding to 1 phrase. The reproduction point information about a single phrase consists of the starting time and ending time. These times are represented as relative time to the from the start of the play. Practically they are represented as values indicating a minute, second, and frame number from left to right separated by colons (":"). Thus, the performance time of the phrase shown in FIG. 19 is 5 (=25−20) seconds and 26 (=70−44) frames.

The example of the data corresponding to 1 phrase shown in FIG. 19 is only one example, and can be represented in other forms. For example, the data can be managed such that the words, translation, and time are managed as separate fields and corresponding data can be read from each field by specifying the 5th line of the words.

Such reproduction point information is stored in the CD data file 104 as the performance time 357 of the music information 350 shown by (c) in FIG. 8. Therefore, the word information about the phrase of the music currently played can be provided for the user as being highlighted on the display in synchronism with the proceeding of the music by obtaining the performance time of the music CD 101 from the controller 206.

After switching the highlighted display point in the word area 4061 in synchronism with the play of the music, it is determined whether or not the word area 4061 has been reproduced (S306). The determination is made by comparing the CD phrase ending time with the reproduction elapsed time indicating the reproduction point obtained in step S304. If it is determined in step S306 that the performance for one line (one phrase) has not been completed ("NO" in S306), then control is returned to step S304. If it is determined in step S306 that the performance for one line (one phrase) has been completed ("YES" in S306), then control is passed to the process in step S307.

It is determined in step S307 whether or not the performance of one music piece has been completed. The determination is made by, for example, comparing the performance time of the music obtained from the TOC data with the time information (reproduction point) obtained in step S304.

If it is determined in step S307 that the performance of the music has been completed ("YES" in S307), the process terminates. If it is determined that the play of the music has been completed ("NO" in S307), control is passed to step S308. In step S308, the necessity or needlessness of the re-display of the information area 406 is determined in step S308. According to the present embodiment, an entire screen (information area 406) is completely switched after all phrases displayed on the screen has been played. Therefore, the necessity or needlessness of the redisplay of the screen is determined depending on whether or not the reproduction of the word information (phrase) has been completed in the word area 4061 at the right bottom in the information area 406 of the display screen 402 in FIG. 9. The determination is made by, for example, comparing the CD phrase ending time with the reproduction elapsed time obtained in step S304.

The display of the word information can be switched not by the switch of the above described screen but by the scroll display in which the word information (phrase) (which has been completely played) is removed from the information area 406. Since the information can be displayed in many other formats, some display formats may be prepared so that the user can optionally select one of them.

If it is determined in step S308 that the data should be re-displayed on the screen (information area 406) ("YES" in S308), then control is returned to step S303. Thus, new word information is displayed on the screen (information area 406) corresponding to the portion of the music currently played. If it is determined that the data is not to be re-displayed (information area 406) (NO in S308), then control is returned to step S304.

Thus, the word information can be displayed on the screen of the CRT 203 in synchronism with the play of each music piece in the music CD 101. Therefore, the user can sing to the accompaniment of the music CD 101 while watching the screen of the CRT 203.

If the words are written in a foreign language, the translation and pronunciation can be displayed on the screen in the word display mode. When the user selects the word display mode, the user can practice the pronunciation of the foreign language displayed on the display screen 402 in the word display mode.

The process shown in FIG. 16 is described below. When the word display process is completed in step S108, it is determined whether or not all music pieces stored on the music CD 101 have been played (S111). If not ("NO" in S111), then control is returned to step S107. If yes ("YES" in S111), then control is returned to step S105.

If it is determined in step S107 that the artist information/music information display mode is entered, the artist information/music information display process is performed (S109).

Figure 20:
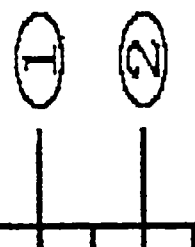
FIG. 20 is a flowchart showing the artist/music information display process.

FIG. 20 is a flowchart showing the artist information/music information display process in detail. The artist information/music information display process is described below in detail by referring the flowchart.

In the artist information/music information display process, the number of the music piece currently played is obtained (S401).

Then, the music information 350 and the artist information 340 of the music currently played is obtained, using the obtained music number as key data, from the added information read from the CD data file 104 corresponding to the music CD 101 loaded onto the main storage device 106 and currently played back. The artist information 340 and music information 350 are displayed on the information area 406 (refer to FIG. 9) (S402).

The playback point on the music CD 101 currently played back is obtained (S403). It is determined whether or not the music has been completely played back (S404). The determination as to whether or not the music has been completely played back is made by comparing the time information obtained in S403 with the performance time obtained from the TOC data. If the music has been completely played ("YES" in S404), the process terminates. If not ("NO" in S404), then control is returned to step S403.

If the artist information/music information display mode is entered, the user can enjoy the music being played while watching the artist information 340 and music information 350 by repeating the processes in steps S403 and S404. As described above, the displayed music information 350 contains the title and explanation of the music, the cover photo of a music CD storing the music, copyright, etc. The artist information 340 contains the name, photo, and profile (gender, blood type, birthday, etc.) of the artist.

When the above described artist information/music information display process, that is, the process in step S109 shown in FIG. 19 is completed, it is determined whether or not all the music pieces stored on the music CD 101 have been completely played (S111). That is, if all the music pieces have been completely played ("YES" in S111), control is returned to step S105. If not ("NO" in S111), control is returned to step S107.

If it is determined in step S107 that the discography mode is entered, the discography display process is performed next (S110).

Figure 15:
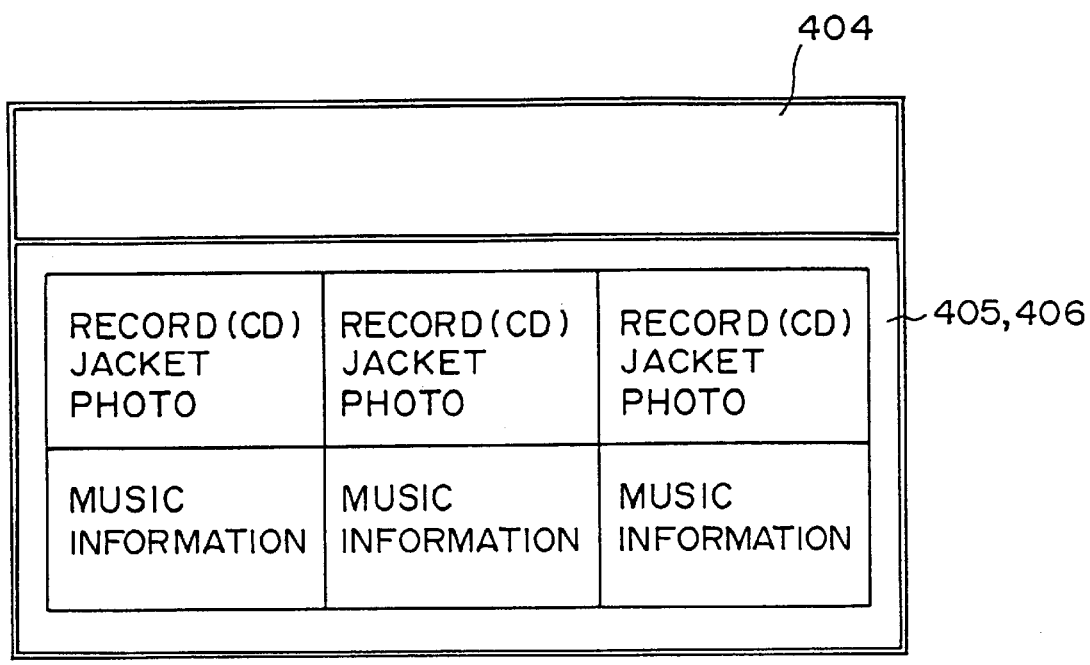
FIG. 15 shows an example of the display in the discography mode.

The discography display process is similar to the above described artist information/music information display process. Therefore, the artist information and the information about the artist's albums, etc. (not shown in the attached drawings) are displayed on the information area 406 while the music is played. FIG. 15 shows an example of the display.

When the discography display process, that is, the process in step S110 shown in FIG. 16, is completed, control is passed to the process in step S111. The playback state of the music CD 101 is determined in step S111, and control is passed to step S105 or S107 depending on the determination result.

Various information about the currently played music is displayed in synchronism with the play of the music depending on the entered mode by repeating the processes in steps S105 through 111. The modes can be entered (switched) by the user's predetermined operations for the input device 204. The viewer software 103 is informed of the operations through, for example, an interruption by the driver software 210 and OS 207. The viewer software 103 performs the above described process through an interrupting operation. The user can set any of the modes by clicking the button, etc. in the mode setting box 404c. Therefore, the modes can be switched depending on the music played through the music CD 101, and the user can see desired information at any time.

According to the present embodiment, the music can be played by clicking the mouse for a desired music piece displayed in the selection list area 405. In the above described process, all music pieces stored on the music CD 101 are listed in the selection list area 405. However, only specifying the name of the desired artist, composer, song writer, etc. can selectively display the desired music piece in the selection list area 405 because the CD data file 104 stores data of the artists, composers, song writers, etc.

Figure 21:
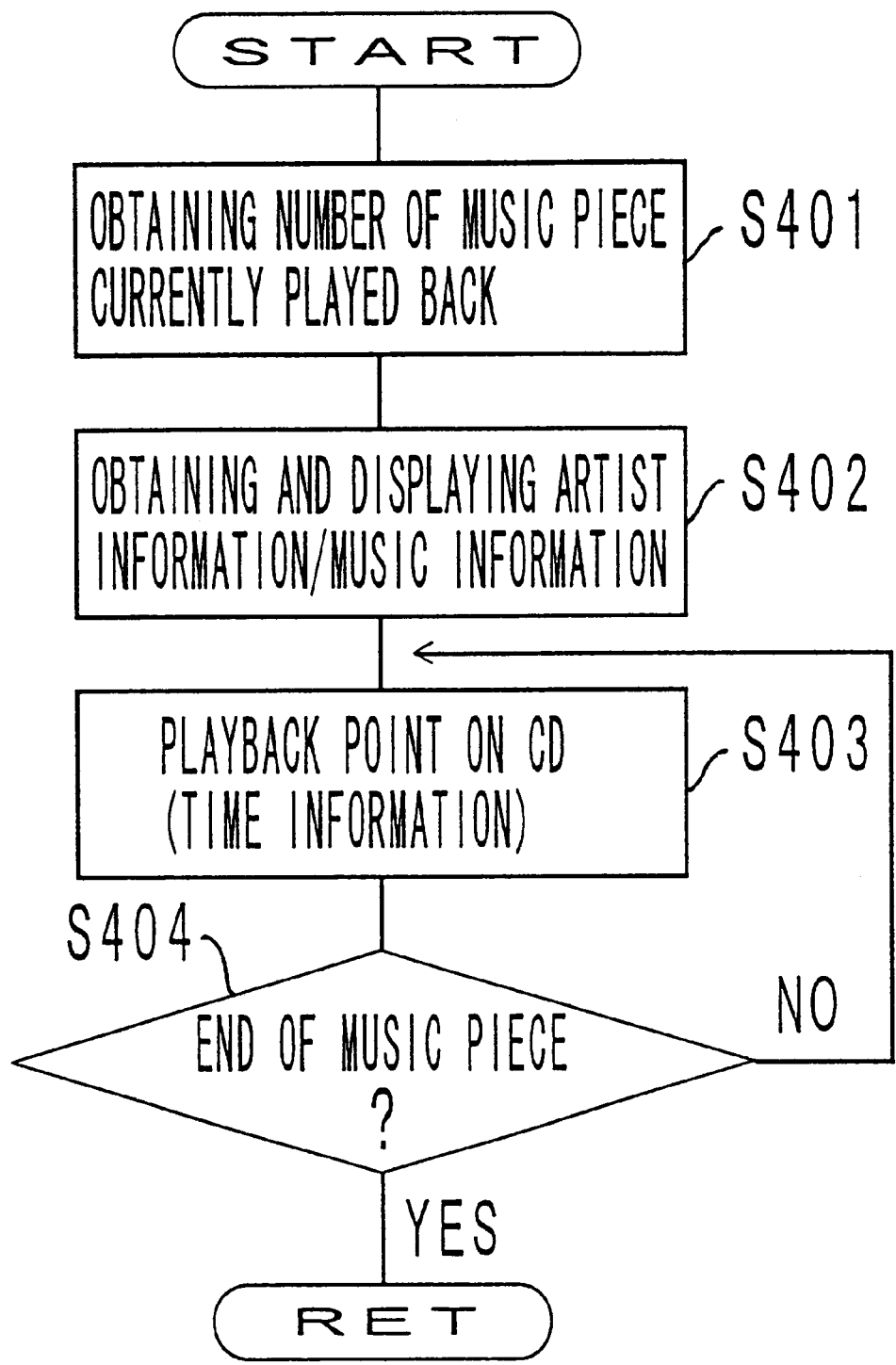
FIG. 21 is a flowchart showing the display position changing process according to the embodiment of the present invention.

Described below is the reproduction point change process. The reproduction point change process is performed by clicking a predetermined button in the mode setting box 404c when the word display mode is entered. When the word display mode is entered, the word information is displayed in phrase unit in the word area 4061 of the information area 406. In the reproduction point change process, each word area 4061 is used as a button indicating a reproduction point, and the reproduction point is changed into the CD phrase start time of the word information displayed in the clicked word area 4061 (refer to FIG. 19). FIG. 21 is a flowchart showing this process, and the detailed explanation of the process is given below.

First, when the user clicks the mouse, the display position information is obtained from the OS 207 (S601). When the display position information is obtained, it is determined according to the display position information whether or not the mouse cursor is positioned in the word area 4061 (S602).

According to the present embodiment, the user can optionally change the size and shape of the information area 406, display screen, and selection list area 405. The user can also specify the size of the displayed characters. The viewer software 103 automatically changes the number of rows and columns depending on the change of each area and specification of displayed characters.

The form (size and shape) of the word area 4061 varies depending on the form of the display screen and the size of characters. In FIG. 22, the information area 406 is divided into 6 word areas 4061. The word areas 4061 are not displayed in the entire information area 406. The mouse may be clicked on other display areas (selection list area 405, etc.). In FIG. 22, 1 through 6 are the word areas 4061 and the order of the performance of the word information pieces in the word areas 4061.

If the music CD 101 is played back when the reproduction point change process is performed, the word area 4061 containing the word information corresponding to the phrase currently played is highlighted on the display. If it is determined in step S602 that the display position of the mouse cursor M is not in the word area 4061 ("NO" in S602), control is returned to step S601.

If it is determined in step S602 that the display position of the mouse cursor M is in the word area 4061 ("YES" in S602), then it is determined whether or not the display position is in the word area 4061 corresponding to the music currently played (S603). If it is determined that the display position is in the word area 4061 corresponding to the music currently played ("YES" in S603), control is returned to step S601.

If it is determined in step S603 that the display position of the mouse cursor M, when clicked, is not in the word area 4061 of the phrase currently played ("NO" in S603), then the word area 4061 corresponding to the phrase currently played is displayed in the normal display format (S604), and the word area 4061 specified by the user click is highlighted on the display (S605).

For example, if the phrase corresponding to the word information displayed in the word area 4061(1) is currently played as shown by (a) in FIG. 22, then the word area 4061(1) is highlighted on the display. If, at this time, the mouse cursor M is moved to the word area 4061(5) and the mouse is clicked, then the series of the processes are performed and the clicked word area 4061(5) is highlighted on the display as shown by (b) in FIG. 22.

If the user specifies and highlights the word area 4061 on the display, then the CD phrase start time for the word area 4061 is selected from the added information (data) loaded from the CD data file (database) 104 onto the main storage device 106 (S606). The CD phrase start time is represented by minute, second, and phrase number as the relative time from the start of the music as shown in FIG. 19. It is stored in the CD data file 104 as the performance time 357 of the music information 350 as shown by (c) in FIG. 8.

According to the selected CD phrase start time, the reproduction point on the music CD 101 is changed (S607), and the series of the processes terminate. The reproduction point on the music CD 101 can be changed by providing a reproduction point change instruction for the driver software 208 on the basis of the CD phrase start time. That is, according to the instruction, the driver software 208 transmits a control command to the controller 206 and drives the reading head 205 through the controller 206 so that the reproduction point can be changed on the music CD 101.

Since the CD data file 104 stores the reproduction point information for each phrase according to the present embodiment, the reproduction point in the music can be optionally changed to any point in phrase unit, and the user can listen only to the desired portion repeatedly. Since the user can optionally specify a desired reproduction point from the displayed word information according to the present embodiment, the user can enjoy the music with good operability without heavy load. Thus, the music CD 101 can be used more widely and more easily as convenient and amusing goods.

In the above described reproduction point change process, the reproduction point is changed by displaying the word information in phrase unit and specifying a desired phrase. The reproduction point can also be changed by specifying, for example, the elapsed reproduction time from the start of the music. Furthermore, the reproduction point can be changed by specifying a value after assigning values to possible reproduction points. A plurality of music pieces can also be specified in reproducing them at optional reproduction points.

In the discography mode according to the present embodiment, only the information about each music CD is displayed on the CRT 203, but various effects can be added by providing the viewer software 103 with the communications capabilities.

Since the CRT 203 can display various information about the music CD 101, the user can buy and pay for the CD after checking the information displayed on the CRT 203 (that is, the user can do shopping online).

Receiving the added information about the music CD 101 prevents the user from buying storage media, which store the information, added to the music CD 101 and are conventionally obtained when the user buys the music CD 101. Thus, the users can easily enjoy the music using the music CDs 101. Since the added information can be loaded onto the auxiliary storage device 105 when necessary, the auxiliary storage device 105 can be efficiently used.

FIG. 1

1. FIRST READING UNIT
2. STORAGE MEDIUM
3. STORAGE UNIT
4. SECOND READING UNIT
5. COMPARING UNIT
6. IDENTIFYING UNIT

FIG. 2

11. STORAGE MEDIUM
12. FRIST READING UNIT
13. DATA REPRODUCING UNIT
14. STORAGE UNIT
15. SECOND UNIT
16. DISPLAY READING UNIT
17. CONTROL UNIT
18. SPECIFYING UNIT

FIG. 3

1. CORRECPONDENCE
2. INSTALLATION
3. OBTAINING REPRODUCTION INFORMATION
4. SPECIFYING REPRODUCTION
5. OUTPUTTING SOUND
6. RETRIEVAL
7. DISPLAY
103. VIEWER SOFTWARE
104. CD DATA FILE
106. COPYING PART OF DATA TO MAIN STORAGE (VIRTUAL MEMORY)

FIG. 4

103. VIEWER SOFTWARE
104. CD DATA FILE
201. CD PLAYBACK DEVICE
202. PERSONAL COMPUTER
204. INPUT DEVICE
205. READING HEAD
206. CONTROLLER.
208 ~210 DRIVER SOFTWARE
211. DECODING CIRCUIT
213. AMPLIFIER
214. VOICE OUTPUT DEVICE

FIG. 5

1. VIEWER
   ADDED INFORMATION
2. INSTALLATION PROGRAM
106. MEMORY

FIG. 6

103. VIEWER
104. CD DATA FILE
105. AUXILIARY STORAGE DEVICE
301. SYSTEM MANAGEMENT FILE
302. TEXT FILE
303. IMAGE FILE

FIG. 7

311. IDENTIFIER ID
312. NAME OF AUXILIARY STORAGE DEVICE AT INSTALLATION POINT
313. FILE STORAGE POSITION IN AUXILIARY STORAGE DEVICE
314. VERSION OF VIEWER SOFTWARE
315. FILE NAME
316. CD DATA VOLUME INFORMATION
317. CD DATA NAME
318. VERSION
319. FILE NAME
104. CD DATA FILE

FIG. 8

330. CD INFORMATION
  1. TITLE OF FOREIGN MUSIC
  2. PRONUNCIATION OF FOREIGN MUSIC TITLE
  3. TITLE OF JAPANESE MUSIC
  4. PRONUNCIATION OF JAPANESE MUSIC TITLE
  5. JACKET PHOTO FILE (IMAGE)
  6. ALBUM INFORMATION FILE (TEXT)
335. PHOTO (FILE NAME)

-continued

336. ALBUM INFORMATION (FILE NAME)
337. TOTAL PERFORMANCE TIME
  7. ARTIST NAME
  8. PRODUCER NAME
  9. ORIGINAL PUBLISHER NAME
  10. SUBPUBLISHER NAME
  11. COPYRIGHT
  12. NUMBER OF MUSIC PIECES
340. ARTIST INFORMATION
  13. NAME
  14. PRONUNCIATION OF NAME
  15. ARTIST INFORMATION FILE (TEXT)
  16. ARTIST PHOTO FILE (IMAGE)
  17. GENDER
343. ARTIST INFORMATION (FILE NAME)
344. PHOTO (FILE NAME)
350. MUSIC INFORMATION
  18. CD NAME
  19. ARTIST NAME
  20. SONG WRITER
  21. COMPOSER
  22. RECOMPOSER
  23. MUSIC NUMBER IN CD
357. PERFORMANCE TIME
358. WORDS (FILE NAME)
  24. COPYRIGHT
  25. TITLE OF JAPANESE MUSIC
  26. PRONUNCIATION OF JAPANESE MUSIC TITLE
  27. TITLE OF FOREIGN MUSIC
  28. PRONUNCIATION OF FOREIGN MUSCI TITLE
  29. WORD FILE (TEXT)

FIG. 9

WORD/TRANSLATION/READING IMAGE
DISCOGRAPHY SCREEN

FIG. 10

406. ARTIST PHOTO
     ARTIST INFORMATION
     RECORD (CD) JACKET PHOTO
     MUSIC INFORMATION

FIG. 11

(a) FOR SMALL NUMBER OF CHARACTERS
    READING
    WORDS
    TRANSLATION
(b) FOR LARGE NUMBER OF CHARACTERS
    READING
    WORDS
    TRANSLATION

FIG. 12

DISPLAY OF READING
We are the challengers.    DISPLAY OF WORDS
        DISPLAY

FIG. 14

RECORD (CD) JACKET PHOTO
MUSIC INFORMATION

FIG. 16

START
 101 ACTIVATING VIEWER
 102 IS MUSIC CD MOUNTED?
 103 IDENTIFYING MUSIC CD
 104 READING DATA CORRESPONDING TO MUSIC CD
 105 DISPLAYING LIST OF MUSIC PIECES IN MUSIC CD
 106 STARTING PLAYBACK OF CD
 107 WHAT MODE?
   1 WORD DISPLAY MODE
   2   DISCOGRAPHY MODE
   3   ARTIST INFORMATION/MUSIC INFORMATION DISPLAY MODE
 108 WORD DISPLAY PROCESS
 109 ARTIST INFORMATION/MUSIC INFORMATION DISPLAY PROCESS
 110 DISCOGRAPHY DISPLAY PROCESS
 111 ARE ALL MUSIC PIECES PROCESSED?

-continued

FIG. 17

201 READING FOLLOWING DATA FROM TOC INFOMATION OF CD
        TOTAL PERFORMANCE TIME OF CD
        TOTAL NUMBER OF MUSIC PIECES OF CD
        PERFORMANCE TIME OF EACH MUSIC PIECE
202 SEARCHING ALL CD DATA IN DATABASE FOR CD WHICH MATCHES MUSIC CD
    WITHIN ALLOWABLE TOLERANCE IN TOTAL PERFORMANCE TIME
203 IS THERE CD WHICH MATCHES MUSIC CD WITHIN ALLOWABLE TOLERANCE?
204 SEARCHING CDs RETRIEVED IN S202 FOR CD WHICH MATCHES MUSIC CD IN
    TOTAL NUMBER OF MUSIC PIECES
205 IS THERE CD WHICH MATCHES MUSIC CD WITHIN ALLOWABLE TOLERANCE?
  1 COMPARING WITH NEXT MUSIC PIECE
206 SEARCHING CDs RETRIEVED IN S204 FOR CD WHICH MATCHES MUSIC CD
    WITHIN ALLOWABLE TOLERANCE IN PERFORMANCE TIME OF EACH MUSIC PIECE
207 IS THERE CD WHICH MATCHES MUSIC CD WITHIN ALLOWABLE TOLERANCE?
208 LAST MUSIC PIECE IN CD?
209 IS THERE SINGLE CD WHICH MATHCES MUSIC CD?
  2   NORMAL TERMINATION
  3   ABNORMAL TERMINATION

FIG. 18

301 OBTAINING NUMBER OF MUSIC CURRENTLY PLAYED BACK
302 OBTAINING DATA OF WORDS, TRANSLATION, AND PRONUNCIATION
303 DISPLAYING DATA FOR ONE SCREEN
304 PLAYBACK POINT ON CD (OBTAINING TIME INFORMATION)
305 CHANGING DISPLAY POSITION OF CORRESPONDING INFORMATION
306 END OF ONE ROW?
307 END OF ONE MUSIC PIECE?
308 IS DATA TO BE RE-DISPLAYED ON SCREEN?

FIG. 19

We are the challengers     WORDS
        TRANSLATION
 - -    READING
                    CD PHRASE START TIME
                    CD PHRASE END TIME

FIG. 20

401 OBTAINING NUMBER OF MUSIC PIECE CURRENTLY PLAYED BACK
402 OBTAINING AND DISPLAYING ARTIST INFORMATION/MUSIC INFORMATION
403 PLAYBACK POINT ON CD (TIME INFORMATION)
404 END OF MUSIC PIECE?

FIG. 21

601 WAITING UNTIL USER CLICKS MOUSE
602 WITHIN WORD AREA?
603 WITHIN AREA OF WORD CURRENTLY PLAYED BACK?
604 TURNING WORD AREA PREVIOUSLY PLAYED BACK INTO NORMAL DISPLAY
605 HIGHLIGHTING SPECIFIED WORD AREA
606 RETRIEVING PERFORMANCE START TIME CORRESPONDING TO SPECIFIED
    WORD AREA FORM DATABASE
607 CHANGING PLAYBACK POINT ON CD
  1 NORMAL TERMINATION

FIG. 22

(a) BEFORE CLICKING
  1 AREA OF WORDS CURRENTLY PLAYED BACK
(b) AFTER CLICKING

What is claimed is:

1. An automatic storage medium identifying device for identifying a storage medium for use with a memory comprising:

a first reading unit reading predetermined information stored on the storage medium for storing data in a predetermined format;

a second reading unit reading storage medium identification information from the memory, wherein the storage medium identification information is not stored in the storage medium; and an identifying unit identifying contents of the storage medium by comparing the predetermined information read by said first reading unit from the storage medium with the storage medium identification information, wherein said first reading unit reads table-of-contents (TOC) data from a read-in area of the music CD when the storage medium is a music compact disc (CD), said identifying unit identifies a type of the storage medium from which the TOC data is read by sequentially comparing at least one of a total performance time, total number of music pieces, and performance time of each music piece contained in the music CD and obtained from the TOC data read by said first reading unit with the storage medium identification information read by said second reading unit from the memory, and said identifying unit compares the total performance time and performance time of each music piece in the music CD obtained from the TOC data with the storage medium identification information, and determines matching if a comparison result indicates a predetermined allowable tolerance.

2. The automatic storage medium identifying device according to claim 1 further comprising:

a control unit outputting from said memory additional information for the data stored in the storage medium based on an identification result from said identifying unit.

3. The automatic storage medium identifying device according to claim 1, wherein said automatic storage medium identifying device comprises a computer systems;

said memory comprises a hard disk or main memory provided within said computer system;

said storage medium identification information comprises the CD identification information; and said hard disk or main memory receives the CD identification information from a compact disk read only memory (CDROM) different from said CD.

4. An automatic music compact disc (CD) identifying method comprising:

reading table-of-contents (TOC) data in a read-in area of a music CD storing sound data;

sequentially comparing information obtained from the TOC data with music CD identification information; and identifying, according to a comparison result, the music CD from which the TOC data is read, wherein said information obtained from the TOC data used in a comparison refers to at least one piece of a total performance time, total number of music pieces, and performance time of each music piece of the music CD, and said total performance time and performance time of each music piece in the music CD obtained from the TOC data are compared with the music CD identification information, and a matching is determined if a comparison result indicates a predetermined allowable tolerance.

* * * * *